US011388072B2

(12) United States Patent
Wu et al.

(10) Patent No.: US 11,388,072 B2
(45) Date of Patent: *Jul. 12, 2022

(54) CORRELATING NETWORK TRAFFIC THAT CROSSES OPAQUE ENDPOINTS

(71) Applicant: ExtraHop Networks, Inc., Seattle, WA (US)

(72) Inventors: Xue Jun Wu, Seattle, WA (US); Arindum Mukerji, Seattle, WA (US); Jeff James Costlow, Kingston, WA (US); Michael Kerber Krause Montague, Lake Forest Park, WA (US); Jesse Abraham Rothstein, Seattle, WA (US); Matthew Alexander Schurr, Mercer Island, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,299

(22) Filed: Jun. 2, 2021

(65) Prior Publication Data

US 2021/0288895 A1 Sep. 16, 2021

Related U.S. Application Data

(63) Continuation-in-part of application No. 16/989,025, filed on Aug. 10, 2020, which is a continuation of
(Continued)

(51) Int. Cl.
*H04L 43/08* (2022.01)
*H04L 47/41* (2022.01)

(52) U.S. Cl.
CPC .............. *H04L 43/08* (2013.01); *H04L 47/41* (2013.01)

(58) Field of Classification Search
CPC ..... H04L 41/16; H04L 47/10; H04L 47/2441; H04L 47/2483; H04L 63/0227;
(Continued)

(56) References Cited

U.S. PATENT DOCUMENTS 5,027,269 A 6/1991 Grant et al.
5,430,727 A 7/1995 Callon
(Continued)

FOREIGN PATENT DOCUMENTS

AU 2008328833 A1 * 7/2010 ......... H04L 63/0209
CN 105071987 A * 11/2015
(Continued)

OTHER PUBLICATIONS

Office Communication for U.S. Appl. No. 13/831,673 dated Sep. 30, 2013, pp. 1-10.
(Continued)

*Primary Examiner* — Eric Nowlin
(74) *Attorney, Agent, or Firm* — John W. Branch; Branch Partners PLLC

(57) ABSTRACT

Embodiments are directed to monitoring network traffic using network monitoring computers (NMCs). Two or more network segments coupled by a traffic forwarding device (TFD) may be monitored. External network addresses and internal network addresses may be determined based on encrypted network traffic exchanged between external endpoints and the TFD and internal network traffic exchanged between internal endpoints and the TFD. Metrics associated with the external network addresses or the internal network addresses may be determined based on the monitoring. Correlation scores may be provided for the external network addresses and the internal network addresses based on of a correlation model, the metrics, or the other metrics. If a correlation score associated with an external network
(Continued)

address and an internal network address exceeds a threshold value, the external network address and the internal network address may be associated with each other based on the correlation score.

24 Claims, 18 Drawing Sheets

Related U.S. Application Data application No. 16/532,275, filed on Aug. 5, 2019, now Pat. No. 10,742,530.

(58) Field of Classification Search
CPC ............ H04L 63/0254; H04L 63/0263; H04L 63/1408; H04L 63/1416; H04L 63/1425; H04L 63/1433; H04L 63/1441; H04L 63/145; H04L 63/1466; H04L 63/16; H04L 2463/041; H04L 2463/141
See application file for complete search history.

(56) References Cited

U.S. PATENT DOCUMENTS

| | | |
|---|---|---|
| 5,541,995 A | 7/1996 | Normile et al. |
| 5,548,646 A * | 8/1996 | Aziz ................... H04L 12/4625 382/124 |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,928,363 A | 7/1999 | Ruvolo |
| 6,058,429 A * | 5/2000 | Ames ................... H04L 49/602 370/399 |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | DiGiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,636,838 B1 * | 10/2003 | Perlman .............. H04L 63/0245 709/229 |
| 6,704,311 B1 | 3/2004 | Chuah et al. |
| 6,704,874 B1 | 3/2004 | Porras et al. |
| 6,765,909 B1 | 7/2004 | Sen et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | More |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen |
| 7,047,303 B2 * | 5/2006 | Lingafelt ............ H04L 67/1002 709/224 |
| 7,089,326 B2 | 8/2006 | Boucher et al. |
| RE39,360 E * | 10/2006 | Aziz ................... H04L 12/4625 713/150 |
| 7,133,365 B2 | 11/2006 | Klinker et al. |
| 7,143,153 B1 | 11/2006 | Black et al. |
| 7,177,930 B1 | 2/2007 | LoPresti |
| 7,181,769 B1 | 2/2007 | Keanini et al. |
| 7,193,968 B1 | 3/2007 | Kapoor et al. |
| 7,313,141 B2 | 12/2007 | Kan et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,580,356 B1 | 8/2009 | Mishra et al. |
| 7,602,731 B2 | 10/2009 | Jain |
| 7,606,706 B1 | 10/2009 | Rubin et al. |
| 7,609,630 B2 | 10/2009 | Gobeil |
| 7,594,273 B2 | 11/2009 | Keanini et al. |
| 7,619,988 B2 | 11/2009 | Shimada et al. |
| 7,620,986 B1 * | 11/2009 | Jagannathan ....... H04L 63/1425 713/150 |
| 7,636,305 B1 * | 12/2009 | Taylor ................. H04L 63/1416 709/227 |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,185,953 B2 | 5/2012 | Rothstein et al. |
| 8,194,542 B2 | 6/2012 | Väänänen et al. |
| 8,352,725 B1 | 1/2013 | O'Toole, Jr. |
| 8,402,540 B2 * | 3/2013 | Kapoor ................ H04L 67/327 709/224 |
| 8,411,677 B1 | 4/2013 | Colloff |
| 8,418,249 B1 | 4/2013 | Nucci et al. |
| 8,443,190 B2 * | 5/2013 | Breton ............... H04L 63/0209 713/166 |
| 8,457,127 B2 | 6/2013 | Eastham et al. |
| 8,494,985 B1 | 7/2013 | Keralapura et al. |
| 8,533,254 B1 | 9/2013 | Whitson, Jr. et al. |
| 8,555,383 B1 | 10/2013 | Marhsall et al. |
| 8,561,177 B1 * | 10/2013 | Aziz ....................... G06F 21/56 726/22 |
| 8,578,024 B1 | 11/2013 | Keralapura et al. |
| 8,613,089 B1 | 12/2013 | Holloway et al. |
| 8,619,579 B1 | 12/2013 | Rothstein et al. |
| 8,627,422 B2 | 1/2014 | Hawkes et al. |
| 8,635,441 B2 * | 1/2014 | Frenkel ............... H04L 63/0428 713/153 |
| 8,699,357 B2 * | 4/2014 | Deshpande ........... H04L 45/28 709/224 |
| 8,707,440 B2 | 4/2014 | Gula et al. |
| 8,744,894 B2 | 6/2014 | Christiansen et al. |
| 8,782,393 B1 | 7/2014 | Rothstein et al. |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,964,548 B1 | 2/2015 | Keralapura et al. |
| 8,971,196 B2 | 3/2015 | Degioanni et al. |
| 9,026,467 B2 | 5/2015 | Bammi et al. |
| 9,036,493 B2 | 5/2015 | Degioanni et al. |
| 9,038,178 B1 * | 5/2015 | Lin ........................ H04L 63/02 713/153 |
| 9,049,216 B2 | 6/2015 | McCanne et al. |
| 9,083,740 B1 | 7/2015 | Ma et al. |
| 9,094,288 B1 | 7/2015 | Nucci et al. |
| 9,094,326 B2 | 7/2015 | Sundararajan et al. |

(56) References Cited

U.S. PATENT DOCUMENTS

| | | | |
|---|---|---|---|
| 9,158,604 B1 | 10/2015 | Christodorescu et al. | |
| 9,176,838 B2 * | 11/2015 | Li | H04L 9/3273 |
| 9,183,573 B2 | 11/2015 | Tseng | |
| 9,189,318 B2 | 11/2015 | Li et al. | |
| 9,191,400 B1 | 11/2015 | Ptasinski et al. | |
| 9,203,865 B2 | 12/2015 | Linden et al. | |
| 9,264,288 B1 | 2/2016 | Arora et al. | |
| 9,338,147 B1 | 5/2016 | Rothstein et al. | |
| 9,357,410 B2 | 5/2016 | Nedeltchev et al. | |
| 9,369,479 B2 * | 6/2016 | Lin | H04L 63/02 |
| 9,380,489 B2 | 6/2016 | Kotecha et al. | |
| 9,391,866 B1 | 7/2016 | Martin et al. | |
| 9,400,871 B1 | 7/2016 | Hewinson | |
| 9,401,925 B1 | 7/2016 | Guo et al. | |
| 9,426,036 B1 | 8/2016 | Roy | |
| 9,430,646 B1 | 8/2016 | Mushtaq et al. | |
| 9,432,430 B1 | 8/2016 | Klenz | |
| 9,460,299 B2 | 10/2016 | Weiss et al. | |
| 9,461,875 B2 | 10/2016 | Groat et al. | |
| 9,479,405 B1 | 10/2016 | Tongaonkar et al. | |
| 9,483,742 B1 | 11/2016 | Ahmed | |
| 9,516,053 B1 | 12/2016 | Muddu et al. | |
| 9,531,736 B1 | 12/2016 | Torres et al. | |
| 9,565,202 B1 | 2/2017 | Kindlund et al. | |
| 9,565,203 B2 | 2/2017 | Bernstein et al. | |
| 9,591,015 B1 | 3/2017 | Amin et al. | |
| 9,621,523 B2 | 4/2017 | Rothstein et al. | |
| 9,654,503 B1 * | 5/2017 | Kowalyshyn | H04L 63/1466 |
| 9,660,879 B1 | 5/2017 | Rothstein et al. | |
| 9,692,658 B2 | 6/2017 | Guo et al. | |
| 9,715,820 B1 | 7/2017 | Boss et al. | |
| 9,729,416 B1 | 8/2017 | Khanal et al. | |
| 9,876,810 B2 * | 1/2018 | McDougal | H04L 63/1433 |
| 9,888,021 B2 * | 2/2018 | Horesh | G06N 20/00 |
| 9,893,897 B2 * | 2/2018 | Li | H04L 63/0227 |
| 9,967,292 B1 | 5/2018 | Higgins et al. | |
| 10,009,364 B2 * | 6/2018 | Dasgupta | H04L 43/16 |
| 10,009,793 B2 | 6/2018 | Wetterwald et al. | |
| 10,027,689 B1 | 7/2018 | Rathor et al. | |
| 10,028,167 B2 | 7/2018 | Calin et al. | |
| 10,033,766 B2 * | 7/2018 | Gupta | H04L 43/04 |
| 10,038,611 B1 | 7/2018 | Wu et al. | |
| 10,050,982 B1 * | 8/2018 | Guerra | H04L 63/1416 |
| 10,063,434 B1 | 8/2018 | Khanal et al. | |
| 10,176,323 B2 * | 1/2019 | Zhang | G06F 21/56 |
| 10,198,667 B2 | 2/2019 | Ryan, Jr. et al. | |
| 10,204,211 B2 | 2/2019 | Hammerle et al. | |
| 10,237,294 B1 | 3/2019 | Zadeh et al. | |
| 10,263,883 B2 | 4/2019 | Kamble | |
| 10,264,003 B1 | 4/2019 | Wu et al. | |
| 10,277,618 B1 | 4/2019 | Wu et al. | |
| 10,305,928 B2 * | 5/2019 | McGrew | H04L 63/166 |
| 10,320,749 B2 | 6/2019 | Sengupta et al. | |
| 10,321,344 B2 | 6/2019 | Barton et al. | |
| 10,326,676 B1 | 6/2019 | Driggs et al. | |
| 10,332,005 B1 | 6/2019 | Liao et al. | |
| 10,348,767 B1 | 7/2019 | Lee et al. | |
| 10,375,155 B1 | 8/2019 | Cai et al. | |
| 10,389,574 B1 | 8/2019 | Wu et al. | |
| 10,411,978 B1 | 9/2019 | Ball et al. | |
| 10,412,080 B1 | 9/2019 | Edwards et al. | |
| 10,419,454 B2 * | 9/2019 | El-Moussa | H04L 63/1416 |
| 10,536,268 B2 * | 1/2020 | Anderson | H04W 72/0426 |
| 10,536,475 B1 | 1/2020 | McCorkle, Jr. et al. | |
| 10,554,665 B1 | 2/2020 | Badawy et al. | |
| 10,581,915 B2 * | 3/2020 | Scherman | H04L 63/1425 |
| 10,594,664 B2 * | 3/2020 | Zaifman | H04L 63/0428 |
| 10,594,718 B1 | 3/2020 | Deaguero et al. | |
| 10,742,677 B1 | 8/2020 | Wu et al. | |
| 10,778,700 B2 * | 9/2020 | Azvine | H04L 63/1425 |
| 10,805,338 B2 * | 10/2020 | Kohout | H04L 41/0686 |
| 10,841,194 B2 * | 11/2020 | Kim | H04L 43/0894 |
| 10,992,693 B2 * | 4/2021 | Luo | H04L 63/1425 |
| 11,057,420 B2 * | 7/2021 | McGrew | H04L 63/1408 |
| 11,159,549 B2 * | 10/2021 | El-Moussa | H04L 63/1416 |
| 11,194,901 B2 * | 12/2021 | El-Moussa | H04L 41/142 |
| 11,201,876 B2 * | 12/2021 | Kallos | H04L 63/1408 |
| 2002/0023080 A1 | 2/2002 | Uga et al. | |
| 2002/0024964 A1 | 2/2002 | Baum et al. | |
| 2002/0035604 A1 | 3/2002 | Cohen et al. | |
| 2002/0055998 A1 | 5/2002 | Riddle et al. | |
| 2002/0065912 A1 | 5/2002 | Catchpole et al. | |
| 2002/0078382 A1 | 6/2002 | Sheikh et al. | |
| 2002/0080720 A1 | 6/2002 | Pegrum et al. | |
| 2002/0091844 A1 | 7/2002 | Craft et al. | |
| 2002/0097724 A1 | 7/2002 | Halme et al. | |
| 2002/0107953 A1 | 8/2002 | Ontiveros et al. | |
| 2002/0133586 A1 | 9/2002 | Shanklin et al. | |
| 2002/0133622 A1 | 9/2002 | Pinto | |
| 2002/0152209 A1 | 10/2002 | Merugu et al. | |
| 2002/0156880 A1 | 10/2002 | Mokuya | |
| 2002/0175934 A1 | 11/2002 | Hand et al. | |
| 2002/0184362 A1 | 12/2002 | Banerjee et al. | |
| 2002/0199098 A1 | 12/2002 | Davis | |
| 2003/0014628 A1 | 1/2003 | Freed et al. | |
| 2003/0018891 A1 * | 1/2003 | Hall | H04L 63/30 713/153 |
| 2003/0023733 A1 * | 1/2003 | Lingafelt | H04L 47/11 709/229 |
| 2003/0084279 A1 | 5/2003 | Campagna | |
| 2003/0093514 A1 | 5/2003 | Valdes et al. | |
| 2003/0131116 A1 | 7/2003 | Jain et al. | |
| 2003/0135667 A1 | 7/2003 | Mann et al. | |
| 2003/0149887 A1 | 8/2003 | Yadav | |
| 2003/0152094 A1 | 8/2003 | Colavito et al. | |
| 2003/0156715 A1 | 8/2003 | Reeds, III et al. | |
| 2003/0204621 A1 | 10/2003 | Poletto et al. | |
| 2003/0212900 A1 | 11/2003 | Liu et al. | |
| 2003/0214913 A1 | 11/2003 | Kan et al. | |
| 2003/0217144 A1 | 11/2003 | Fu et al. | |
| 2003/0233361 A1 | 12/2003 | Cady | |
| 2004/0003094 A1 | 1/2004 | See | |
| 2004/0047325 A1 | 3/2004 | Hameleers et al. | |
| 2004/0049699 A1 | 3/2004 | Griffith et al. | |
| 2004/0073512 A1 | 4/2004 | Maung | |
| 2004/0088544 A1 | 5/2004 | Tariq et al. | |
| 2004/0088557 A1 | 5/2004 | Malcolm et al. | |
| 2004/0093414 A1 | 5/2004 | Orton | |
| 2004/0093513 A1 | 5/2004 | Cantrell et al. | |
| 2004/0146006 A1 | 7/2004 | Jackson | |
| 2004/0162070 A1 | 8/2004 | Baral et al. | |
| 2004/0199630 A1 | 10/2004 | Sarkissian et al. | |
| 2004/0250059 A1 | 12/2004 | Ramelson et al. | |
| 2005/0015455 A1 | 1/2005 | Liu | |
| 2005/0015622 A1 | 1/2005 | Williams et al. | |
| 2005/0050316 A1 | 3/2005 | Peles | |
| 2005/0060427 A1 | 3/2005 | Phillips et al. | |
| 2005/0066196 A1 | 3/2005 | Yagi | |
| 2005/0086255 A1 | 4/2005 | Schran et al. | |
| 2005/0091341 A1 | 4/2005 | Knight et al. | |
| 2005/0091357 A1 | 4/2005 | Krantz et al. | |
| 2005/0100000 A1 | 5/2005 | Faulkner et al. | |
| 2005/0111367 A1 | 5/2005 | Jonathan Chao et al. | |
| 2005/0125553 A1 | 6/2005 | Wu et al. | |
| 2005/0125684 A1 | 6/2005 | Schmidt | |
| 2005/0182833 A1 | 8/2005 | Duffie, III et al. | |
| 2005/0193245 A1 | 9/2005 | Hayden et al. | |
| 2005/0201363 A1 | 9/2005 | Gilchrist et al. | |
| 2005/0210242 A1 | 9/2005 | Troxel et al. | |
| 2005/0234920 A1 | 10/2005 | Rhodes | |
| 2005/0251009 A1 | 11/2005 | Morita et al. | |
| 2005/0262237 A1 | 11/2005 | Fulton et al. | |
| 2005/0270975 A1 | 12/2005 | Meylan et al. | |
| 2006/0029096 A1 | 2/2006 | Babbar et al. | |
| 2006/0045016 A1 | 3/2006 | Dawdy et al. | |
| 2006/0045017 A1 | 3/2006 | Yamasaki | |
| 2006/0075358 A1 | 4/2006 | Ahokas | |
| 2006/0085526 A1 | 4/2006 | Gulland | |
| 2006/0101068 A1 | 5/2006 | Stuhec et al. | |
| 2006/0106743 A1 | 5/2006 | Horvitz | |
| 2006/0123477 A1 | 6/2006 | Raghavan et al. | |
| 2006/0171333 A1 | 8/2006 | Shimada et al. | |
| 2006/0174343 A1 | 8/2006 | Duthie et al. | |
| 2006/0184535 A1 | 8/2006 | Kaluskar et al. | |

(56) References Cited

U.S. PATENT DOCUMENTS

| | | |
|---|---|---|
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1* | 9/2006 | Schcolnik ............ H04L 63/145 709/230 |
| 2006/0230452 A1 | 10/2006 | Field |
| 2006/0230456 A1 | 10/2006 | Nagabhushan et al. |
| 2006/0233349 A1 | 10/2006 | Cooper |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1 | 9/2007 | Liu et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130645 A1* | 6/2008 | Deshpande ............ H04L 45/28 370/392 |
| 2008/0130659 A1 | 6/2008 | Polland |
| 2008/0133517 A1* | 6/2008 | Kapoor .................. H04L 29/06 |
| 2008/0133518 A1* | 6/2008 | Kapoor .................. G06F 9/505 |
| 2008/0134330 A1* | 6/2008 | Kapoor ................ H04L 67/325 726/22 |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0162390 A1* | 7/2008 | Kapoor ................ H04L 63/145 706/20 |
| 2008/0172416 A1 | 7/2008 | Ito |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0168657 A1 | 7/2009 | Puri et al. |
| 2009/0187653 A1 | 7/2009 | Fu et al. |
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0268605 A1 | 10/2009 | Campbell et al. |
| 2009/0271469 A1 | 10/2009 | Benco et al. |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1* | 12/2009 | Frenkel ................. G06F 21/50 713/153 |
| 2009/0320138 A1* | 12/2009 | Keanini ............... H04L 63/1416 713/153 |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0250918 A1* | 9/2010 | Tremblay ............ H04L 47/2441 706/46 |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0126259 A1 | 5/2011 | Krishnamurthi et al. |
| 2011/0126275 A1 | 5/2011 | Anderson et al. |
| 2011/0150220 A1* | 6/2011 | Breton .................. H04L 63/105 380/255 |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0280149 A1 | 11/2011 | Okada et al. |
| 2011/0296002 A1 | 12/2011 | Caram |
| 2011/0320394 A1 | 12/2011 | McKeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Tönsing et al. |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233694 A1 | 9/2012 | Baliga et al. |
| 2012/0243533 A1 | 9/2012 | Leong |
| 2012/0278477 A1 | 11/2012 | Terrell et al. |
| 2012/0278625 A1 | 11/2012 | Narayanan et al. |
| 2012/0278890 A1* | 11/2012 | Maatta .................. H04L 43/062 726/23 |
| 2012/0284791 A1* | 11/2012 | Miller .................. H04L 63/0227 726/22 |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010608 A1 | 1/2013 | Ramachandran et al. |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0133032 A1 | 5/2013 | Li et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0198827 A1 | 8/2013 | Bhaskaran et al. |
| 2013/0212297 A1 | 8/2013 | Varga |
| 2013/0227259 A1 | 8/2013 | Kim |
| 2013/0232104 A1 | 9/2013 | Goyal et al. |
| 2013/0262655 A1 | 10/2013 | Deschênes et al. |
| 2013/0305357 A1 | 11/2013 | Ayyagari et al. |
| 2013/0339514 A1 | 12/2013 | Crank et al. |

(56) References Cited

U.S. PATENT DOCUMENTS

| | | | |
|---|---|---|---|
| 2013/0347018 A1 | 12/2013 | Limp et al. | |
| 2014/0020067 A1* | 1/2014 | Kim | H04L 63/0861 |
| | | | 726/4 |
| 2014/0040451 A1 | 2/2014 | Agrawal et al. | |
| 2014/0068035 A1 | 3/2014 | Croy et al. | |
| 2014/0075536 A1 | 3/2014 | Davis et al. | |
| 2014/0077956 A1 | 3/2014 | Sampath et al. | |
| 2014/0109168 A1 | 4/2014 | Ashley et al. | |
| 2014/0149456 A1 | 5/2014 | Carr et al. | |
| 2014/0164584 A1 | 6/2014 | Joe et al. | |
| 2014/0165207 A1 | 6/2014 | Engel et al. | |
| 2014/0189093 A1 | 7/2014 | du Toit et al. | |
| 2014/0195797 A1 | 7/2014 | du Toit | |
| 2014/0222998 A1 | 8/2014 | Vasseur et al. | |
| 2014/0223325 A1 | 8/2014 | Melendez et al. | |
| 2014/0241164 A1 | 8/2014 | Cociglio et al. | |
| 2014/0242972 A1 | 8/2014 | Slotznick | |
| 2014/0258511 A1 | 9/2014 | Sima et al. | |
| 2014/0269777 A1 | 9/2014 | Rothstein et al. | |
| 2014/0304211 A1 | 10/2014 | Horvitz | |
| 2014/0310392 A1 | 10/2014 | Ho | |
| 2014/0317288 A1 | 10/2014 | Krueger et al. | |
| 2014/0344633 A1 | 11/2014 | Li et al. | |
| 2014/0351415 A1 | 11/2014 | Harrigan et al. | |
| 2015/0006896 A1 | 1/2015 | Franck | |
| 2015/0007314 A1 | 1/2015 | Vaughan | |
| 2015/0007316 A1 | 1/2015 | Ben-Shalom et al. | |
| 2015/0023168 A1 | 1/2015 | Kotecha et al. | |
| 2015/0026027 A1 | 1/2015 | Priess et al. | |
| 2015/0058987 A1 | 2/2015 | Thure et al. | |
| 2015/0063158 A1 | 3/2015 | Nedeltchev et al. | |
| 2015/0074258 A1 | 3/2015 | Ferreira et al. | |
| 2015/0074462 A1 | 3/2015 | Jacoby | |
| 2015/0089034 A1 | 3/2015 | Stickle et al. | |
| 2015/0096022 A1 | 4/2015 | Vincent et al. | |
| 2015/0100780 A1 | 4/2015 | Rubin et al. | |
| 2015/0106616 A1 | 4/2015 | Nix | |
| 2015/0106930 A1 | 4/2015 | Honda et al. | |
| 2015/0113588 A1 | 4/2015 | Wing et al. | |
| 2015/0121461 A1 | 4/2015 | Dulkin et al. | |
| 2015/0134554 A1 | 5/2015 | Clais et al. | |
| 2015/0134776 A1 | 5/2015 | Kruglick | |
| 2015/0149828 A1 | 5/2015 | Mukerji et al. | |
| 2015/0180759 A1 | 6/2015 | Fallon | |
| 2015/0180890 A1 | 6/2015 | Ronen et al. | |
| 2015/0188702 A1 | 7/2015 | Men et al. | |
| 2015/0199613 A1 | 7/2015 | Ruiz et al. | |
| 2015/0227859 A1 | 8/2015 | Ames, II | |
| 2015/0229661 A1 | 8/2015 | Balabine et al. | |
| 2015/0242627 A1 | 8/2015 | Lee et al. | |
| 2015/0249512 A1 | 9/2015 | Adimatyam et al. | |
| 2015/0269358 A1 | 9/2015 | Hesketh et al. | |
| 2015/0277802 A1 | 10/2015 | Oikarinen et al. | |
| 2015/0304350 A1* | 10/2015 | Lin | H04L 63/1425 |
| | | | 726/23 |
| 2015/0331771 A1 | 11/2015 | Conway | |
| 2015/0341379 A1 | 11/2015 | Lefebvre et al. | |
| 2015/0350167 A1 | 12/2015 | Djakovic | |
| 2015/0365438 A1 | 12/2015 | Carver et al. | |
| 2016/0006766 A1 | 1/2016 | Joo | |
| 2016/0026922 A1 | 1/2016 | Vasseur et al. | |
| 2016/0028755 A1 | 1/2016 | Vasseur et al. | |
| 2016/0036647 A1 | 2/2016 | Gonzalez et al. | |
| 2016/0043919 A1 | 2/2016 | Connelly et al. | |
| 2016/0055335 A1 | 2/2016 | Herwono et al. | |
| 2016/0056959 A1 | 2/2016 | Blom et al. | |
| 2016/0080236 A1* | 3/2016 | Nikolaev | H04L 43/026 |
| | | | 709/224 |
| 2016/0093205 A1 | 3/2016 | Boyer | |
| 2016/0119215 A1 | 4/2016 | Deschênes et al. | |
| 2016/0127401 A1 | 5/2016 | Chauhan et al. | |
| 2016/0134659 A1 | 5/2016 | Reddy et al. | |
| 2016/0142435 A1 | 5/2016 | Bernstein et al. | |
| 2016/0173288 A1* | 6/2016 | Li | H04L 63/0428 |
| | | | 713/168 |
| 2016/0173556 A1 | 6/2016 | Park et al. | |
| 2016/0182274 A1 | 6/2016 | Kiesekamp et al. | |
| 2016/0197949 A1 | 7/2016 | Nyhuis et al. | |
| 2016/0219066 A1 | 7/2016 | Vasseur et al. | |
| 2016/0226913 A1 | 8/2016 | Sood et al. | |
| 2016/0241574 A1* | 8/2016 | Kumar | H04L 63/12 |
| 2016/0262044 A1 | 9/2016 | Calin et al. | |
| 2016/0285752 A1 | 9/2016 | Joshi | |
| 2016/0294870 A1 | 10/2016 | Banerjee et al. | |
| 2016/0301624 A1 | 10/2016 | Gonzalez et al. | |
| 2016/0301709 A1 | 10/2016 | Hassanzadeh et al. | |
| 2016/0308725 A1 | 10/2016 | Tang et al. | |
| 2016/0352761 A1* | 12/2016 | McGrew | H04L 63/166 |
| 2016/0357964 A1 | 12/2016 | Mulchandani | |
| 2016/0357967 A1 | 12/2016 | Mulchandani | |
| 2016/0359872 A1 | 12/2016 | Yadav et al. | |
| 2016/0359915 A1* | 12/2016 | Gupta | H04L 63/20 |
| 2016/0366020 A1 | 12/2016 | Ramachandran et al. | |
| 2016/0373414 A1 | 12/2016 | MacCarthaigh | |
| 2016/0380885 A1 | 12/2016 | Jani et al. | |
| 2017/0048109 A1 | 2/2017 | Kant et al. | |
| 2017/0070416 A1* | 3/2017 | Narayanan | H04L 45/38 |
| 2017/0076206 A1 | 3/2017 | Lastras-Montano et al. | |
| 2017/0085590 A1 | 3/2017 | Hsu et al. | |
| 2017/0090906 A1 | 3/2017 | Reynolds | |
| 2017/0093796 A1 | 3/2017 | Wang et al. | |
| 2017/0093891 A1 | 3/2017 | Mitchell | |
| 2017/0093897 A1 | 3/2017 | Cochin et al. | |
| 2017/0097982 A1 | 4/2017 | Zhang et al. | |
| 2017/0099196 A1 | 4/2017 | Barsheshet et al. | |
| 2017/0111272 A1 | 4/2017 | Liu et al. | |
| 2017/0118092 A1 | 4/2017 | Dixon et al. | |
| 2017/0123886 A1 | 5/2017 | Vaideeswaran | |
| 2017/0126472 A1 | 5/2017 | Margalit et al. | |
| 2017/0126709 A1 | 5/2017 | Baradaran et al. | |
| 2017/0134937 A1 | 5/2017 | Miller et al. | |
| 2017/0195353 A1 | 7/2017 | Taylor et al. | |
| 2017/0230270 A1 | 8/2017 | Padinhakara et al. | |
| 2017/0230417 A1 | 8/2017 | Amar et al. | |
| 2017/0270105 A1 | 9/2017 | Ninan et al. | |
| 2017/0279837 A1* | 9/2017 | Dasgupta | H04L 41/142 |
| 2017/0279838 A1 | 9/2017 | Dasgupta et al. | |
| 2017/0279839 A1 | 9/2017 | Vasseur et al. | |
| 2017/0288974 A1 | 10/2017 | Yoshihira et al. | |
| 2017/0288987 A1 | 10/2017 | Pasupathy et al. | |
| 2017/0289104 A1 | 10/2017 | Shankar et al. | |
| 2017/0289168 A1 | 10/2017 | Bar et al. | |
| 2017/0289185 A1 | 10/2017 | Mandyam | |
| 2017/0289847 A1 | 10/2017 | Wetterwald et al. | |
| 2017/0310703 A1 | 10/2017 | Ackerman et al. | |
| 2017/0324758 A1 | 11/2017 | Hart et al. | |
| 2017/0353437 A1 | 12/2017 | Ayyadevara et al. | |
| 2017/0353437 A1 | 12/2017 | Faigon et al. | |
| 2017/0364794 A1* | 12/2017 | Mahkonen | H04L 63/0428 |
| 2017/0366526 A1 | 12/2017 | Wood et al. | |
| 2018/0007087 A1 | 1/2018 | Grady et al. | |
| 2018/0013650 A1 | 1/2018 | Khanal et al. | |
| 2018/0033089 A1 | 2/2018 | Goldman et al. | |
| 2018/0084011 A1 | 3/2018 | Joseph et al. | |
| 2018/0091413 A1 | 3/2018 | Richards et al. | |
| 2018/0091534 A1 | 3/2018 | Dubrovsky et al. | |
| 2018/0103056 A1* | 4/2018 | Kohout | H04L 63/1416 |
| 2018/0109507 A1 | 4/2018 | Caldera et al. | |
| 2018/0109557 A1 | 4/2018 | Yeo et al. | |
| 2018/0115566 A1* | 4/2018 | Azvine | H04L 63/0428 |
| 2018/0131675 A1 | 5/2018 | Sengupta et al. | |
| 2018/0131711 A1 | 5/2018 | Chen et al. | |
| 2018/0137001 A1 | 5/2018 | Zong et al. | |
| 2018/0139227 A1 | 5/2018 | Martin et al. | |
| 2018/0167310 A1 | 6/2018 | Kamble | |
| 2018/0191755 A1 | 7/2018 | Monaco et al. | |
| 2018/0198812 A1 | 7/2018 | Christodorescu et al. | |
| 2018/0219879 A1 | 8/2018 | Pierce | |
| 2018/0260715 A1 | 9/2018 | Yan et al. | |
| 2018/0262487 A1* | 9/2018 | Zaifman | H04L 63/0428 |
| 2018/0276561 A1 | 9/2018 | Pasternack et al. | |
| 2018/0351781 A1 | 12/2018 | Movsisyan et al. | |
| 2018/0351970 A1 | 12/2018 | Majumder et al. | |
| 2018/0375882 A1* | 12/2018 | Kallos | G06F 21/566 |

(56) References Cited

U.S. PATENT DOCUMENTS

| | | | |
|---|---|---|---|
| 2018/0375893 | A1 | 12/2018 | Jordan et al. |
| 2019/0005205 | A1 | 1/2019 | Dargar et al. |
| 2019/0007283 | A1 | 1/2019 | Kieviet et al. |
| 2019/0012441 | A1 | 1/2019 | Tuli et al. |
| 2019/0028357 | A1 | 1/2019 | Kokkula et al. |
| 2019/0052554 | A1 | 2/2019 | Mukerji et al. |
| 2019/0052675 | A1 | 2/2019 | Krebs |
| 2019/0068465 | A1 | 2/2019 | Khanal et al. |
| 2019/0095478 | A1 | 3/2019 | Tankersley et al. |
| 2019/0102469 | A1 | 4/2019 | Makovsky et al. |
| 2019/0121979 | A1 | 4/2019 | Chari et al. |
| 2019/0132359 | A1 | 5/2019 | Kraenzel et al. |
| 2019/0163678 | A1 | 5/2019 | Bath et al. |
| 2019/0171725 | A1 | 6/2019 | Shen et al. |
| 2019/0196912 | A1 | 6/2019 | Didehban et al. |
| 2019/0230095 | A1* | 7/2019 | McGrew ............ H04L 63/166 |
| 2019/0236149 | A1 | 8/2019 | Kuruvada et al. |
| 2019/0245734 | A1 | 8/2019 | Wu et al. |
| 2019/0245763 | A1 | 8/2019 | Wu et al. |
| 2019/0266999 | A1 | 8/2019 | Chandrasekaran et al. |
| 2019/0303198 | A1 | 10/2019 | Kim et al. |
| 2019/0372828 | A1 | 12/2019 | Wu et al. |
| 2020/0034528 | A1 | 1/2020 | Yang et al. |
| 2020/0067952 | A1 | 2/2020 | Deaguero et al. |
| 2020/0099703 | A1* | 3/2020 | Singh ............... H04L 63/1408 |
| 2020/0220849 | A1* | 7/2020 | Zaifman ............ H04L 63/0823 |
| 2020/0236131 | A1* | 7/2020 | Vejman ............. H04L 41/147 |
| 2020/0287885 | A1 | 9/2020 | Rodniansky |
| 2020/0389469 | A1* | 12/2020 | Litichever ........... H04L 63/0236 |
| 2021/0006589 | A1* | 1/2021 | Kohout ............. H04L 63/145 |
| 2021/0185087 | A1 | 6/2021 | Wu et al. |
| 2021/0250368 | A1* | 8/2021 | Hearty ............... H04L 63/20 |
| 2021/0288993 | A1* | 9/2021 | Kraning ............ H04L 63/1408 |
| 2021/0360004 | A1* | 11/2021 | McGrew ............ H04L 63/145 |
| 2021/0360011 | A1* | 11/2021 | O'Hara .............. H04L 63/02 |

FOREIGN PATENT DOCUMENTS

| | | | | |
|---|---|---|---|---|
| CN | 106170008 | A | * | 11/2016 |
| CN | 107646190 | A | * | 1/2018 ............ G06F 17/141 |
| CN | 107667510 | A | * | 2/2018 ......... H04L 63/1408 |
| CN | 109104441 | A | * | 12/2018 ......... H04L 63/1425 |
| CN | 109542772 | A1 | | 3/2019 |
| CN | 110113349 | A | * | 8/2019 |
| CN | 107667510 | B | * | 11/2020 ......... H04L 63/1408 |
| CN | 112085039 | A | * | 12/2020 |
| CN | 112398876 | A | * | 2/2021 |
| CN | 107646190 | B | * | 3/2021 ............ G06F 17/141 |
| DE | 69533953 | | * | 9/1995 |
| DE | 69533953 | | * | 3/2005 ......... H04L 63/0428 |
| DE | 69533953 | T2 | * | 4/2006 ............ H04L 12/22 |
| EP | 0702477 | A2 | * | 9/1995 |
| EP | 0702477 | A3 | * | 9/1995 |
| EP | 0702477 | B1 | * | 9/1995 |
| EP | 702477 | A2 | * | 3/1996 ............ H04L 12/22 |
| EP | 0702477 | A2 | * | 3/1996 ............ H04L 63/164 |
| EP | 0702477 | A3 | * | 7/1999 ............ H04L 12/22 |
| EP | 1026867 | A2 | | 8/2000 |
| EP | 0702477 | B1 | * | 1/2005 ............ H04L 12/22 |
| EP | 2057576 | A2 | * | 5/2009 ............ G06F 21/50 |
| EP | 2215801 | B1 | * | 4/2011 ......... H04L 63/0209 |
| EP | 2057576 | A4 | * | 4/2012 ............ G06F 21/50 |
| EP | 3089424 | A1 | | 11/2016 |
| EP | 3113443 | A1 | | 1/2017 |
| EP | 3306890 | A1 | * | 4/2018 ............ G06N 20/00 |
| EP | 3394784 | B1 | * | 10/2020 ......... G06F 21/50 |
| EP | 3272095 | B1 | * | 3/2021 ............ G06F 17/141 |
| FR | 2924552 | A1 | * | 6/2009 ......... H04L 63/0209 |
| GB | 2545910 | A | * | 7/2017 ............ G06F 21/564 |
| GB | 2545910 | B | * | 2/2018 ............ G06F 21/564 |
| KR | 100388606 | B1 | * | 9/1995 |
| KR | 960012819 | A | * | 9/1995 |
| KR | 960012819 | A | * | 4/1996 ......... H04L 63/0428 |
| KR | 100388606 | B1 | * | 11/2003 ......... H04L 12/4625 |
| KR | 101662614 | B1 | * | 10/2013 |
| KR | 20140093060 | A | | 7/2014 |
| KR | 101662614 | B1 | * | 10/2016 ......... H04L 63/0428 |
| NZ | 586270 | A | * | 12/2011 ......... H04L 63/0209 |
| WO | WO-2008026212 | A2 | * | 3/2008 ............ G06F 21/50 |
| WO | 2009015461 | A1 | | 2/2009 |
| WO | WO-2008026212 | A3 | * | 5/2009 ............ G06F 21/50 |
| WO | WO-2009068603 | A2 | * | 6/2009 ......... H04L 63/0209 |
| WO | WO-2015128613 | A1 | * | 9/2015 ......... H04L 63/1408 |
| WO | 2016118131 | A1 | | 7/2016 |
| WO | 2016144932 | A1 | | 9/2016 |
| WO | WO-2016146610 | A1 | * | 9/2016 ............ G06F 17/141 |
| WO | WO-2016191486 | A1 | * | 12/2016 ......... H04L 63/1408 |
| WO | WO-2017108575 | A1 | * | 6/2017 ............ G06F 21/50 |
| WO | WO-2017108576 | A1 | * | 6/2017 ............ G06F 21/50 |

OTHER PUBLICATIONS

Office Communication for U.S. Appl. No. 13/831,673 dated Mar. 6, 2014, pp. 1-12.
Office Communication for U.S. Appl. No. 13/831,673 dated May 22, 2014, pp. 1-5.
Office Communication for U.S. Appl. No. 13/831,626 dated Sep. 3, 2013, pp. 1-17.
Office Communication for U.S. Appl. No. 13/831,959 dated Aug. 22, 2013, pp. 1-9.
Handel, Theodore G. et al., "Hiding data in the OSI network model." In: Anderson R. (eds) Information Hiding. IH 1996. Lecture Notes in Computer Science, vol. 1174. Springer, Berlin, Heidelberg. pp. 23-38.
Office Communication for U.S. Appl. No. 14/500,893 dated Nov. 20, 2014, pp. 1-15.
Office Communication for U.S. Appl. No. 14/107,580 dated Mar. 6, 2014, pp. 1-13.
Office Communication for U.S. Appl. No. 14/107,580 dated Sep. 15, 2014, pp. 1-15.
Office Communication for U.S. Appl. No. 13/831,908 dated Aug. 9, 2013, pp. 1-29.
Office Communication for U.S. Appl. No. 13/831,908 dated Jan. 13, 2014, pp. 1-31.
Office Communication for U.S. Appl. No. 13/831,908 dated Apr. 9, 2014, pp. 1-3.
Office Communication for U.S. Appl. No. 13/831,908 dated Jun. 25, 2014, pp. 1-15.
Office Communication for U.S. Appl. No. 14/518,996 dated Nov. 20, 2014, pp. 1-41.
Office Communication for U.S. Appl. No. 14/107,631 dated Feb. 20, 2014, pp. 1-16.
Office Communication for U.S. Appl. No. 14/107,631 dated Sep. 26, 2014, pp. 1-14.
Office Communication for U.S. Appl. No. 14/107,631 dated Dec. 30, 2014, pp. 1-12.
Handley, Mark et al., "Network Intrusion Detection: Evasion, Traffic Normalization, and End-to-End Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, Juan Antonio Cordero, "Evaluation of OSPF Extensions in MANET Routing," Paris, 2007, pp. 1-192.
Parsons, Christopher, "Moving Across the Internet: Code-Bodies, Code-Corpses, and Network Architecture," May 9, 2010, pp. 1-20.
Zander, Sebastian et al., "Covert Channels and Countermeasures in Computer Network Protocols," Dec. 2007, pp. 1-7.
Office Communication for U.S. Appl. No. 14/107,580 dated Mar. 17, 2015, pp. 1-5.
Lin, Mark, "An Overview of Session Hijacking at the Network and Application Levels," Jan. 18, 2005, pp. 1-16.
U.S. Appl. No. 11/683,643, filed Mar. 8, 2007, pp. 1-48.
U.S. Appl. No. 11/679,356, filed Feb. 27, 2007, pp. 1-45.
Office Communication for U.S. Appl. No. 12/326,672 dated Jun. 9, 2010, pp. 1-9.
Office Communication for U.S. Appl. No. 12/326,672 dated Dec. 23, 2010, pp. 1-15.

(56) References Cited

OTHER PUBLICATIONS

Office Communication for U.S. Appl. No. 12/326,672 dated Jun. 22, 2011, pp. 1-16.
Office Communication for U.S. Appl. No. 12/326,672 dated Oct. 24, 2011, pp. 1-9.
Office Communication for U.S. Appl. No. 11/683,643 dated Apr. 28, 2010, pp. 1-35.
Office Communication for U.S. Appl. No. 11/683,643 dated Oct. 14, 2010, pp. 1-43.
Office Communication for U.S. Appl. No. 11/683,643 dated Aug. 25, 2011, pp. 1-43.
Office Communication for U.S. Appl. No. 11/683,643 dated Jan. 23, 2012, pp. 1-22.
Office Communication for U.S. Appl. No. 15/014,932 dated Jun. 10, 2016, pp. 1-20.
Office Communication for U.S. Appl. No. 15/207,213 dated Oct. 25, 2016, pp. 1-18.
Office Communication for U.S. Appl. No. 15/014,932 dated Dec. 14, 2016, pp. 1-26.
Digital Imaging and Communications in Medicine (DICOM), Part 6: Data Dictionary, PS 3.6-2011. 2011, http://dicom.nema.org/Dicom/2011/11_06pu.pdf, pp. 1-216.
Health Level Seven, Version 2.6, Appendix A. Nov. 2007, https://www.hl7.org/special/committees/vocab/V26_Appendix_A.pdf, pp. 1-255.
Office Communication for U.S. Appl. No. 15/207,213 dated Feb. 23, 2017, pp. 1-24.
Office Communication for U.S. Appl. No. 15/014,932 dated Mar. 3, 2017, pp. 1-6.
Office Communication for U.S. Appl. No. 15/207,213 dated May 8, 2017, pp. 1-6.
Office Communication for U.S. Appl. No. 15/207,213 dated Jun. 1, 2017, pp. 1-24.
Office Communication for U.S. Appl. No. 15/014,932 dated Aug. 1, 2017, pp. 1-27.
Office Communication for U.S. Appl. No. 15/690,135 dated Jan. 18, 2018, pp. 1-6.
Office Communication for U.S. Appl. No. 15/891,311 dated Apr. 23, 2018, pp. 1-18.
Office Communication for U.S. Appl. No. 15/892,327 dated Apr. 23, 2018, pp. 1-6.
Office Communication for U.S. Appl. No. 15/014,932 dated May 15, 2018, pp. 1-23.
Office Communication for U.S. Appl. No. 15/891,273 dated Jun. 19, 2018, pp. 1-20.
Office Communication for U.S. Appl. No. 15/014,932 dated Jul. 16, 2018, pp. 1-4.
Office Communication for U.S. Appl. No. 15/690,135 dated May 22, 2018, pp. 1-7.
Office Communication for U.S. Appl. No. 15/984,197 dated Aug. 31, 2018, pp. 1-25.
Office Communication for U.S. Appl. No. 15/891,311 dated Sep. 24, 2018, pp. 1-14.
Office Communication for U.S. Appl. No. 16/048,939 dated Sep. 19, 2018, pp. 1-9.
Office Communication for U.S. Appl. No. 16/113,442 dated Nov. 6, 2018, pp. 1-10.
Office Communication for U.S. Appl. No. 16/100,116 dated Nov. 15, 2018, pp. 1-7.
Office Communication for U.S. Appl. No. 15/014,932 dated Nov. 23, 2018, pp. 1-10.
Office Communication for U.S. Appl. No. 16/107,509 dated Oct. 26, 2018, pp. 1-26.
Office Communication for U.S. Appl. No. 15/891,273 dated Jan. 15, 2019, pp. 1-23.
Office Communication for U.S. Appl. No. 15/891,311 dated Jan. 29, 2019, pp. 1-8.
Office Communication for U.S. Appl. No. 16/174,051 dated Jan. 29, 2019, pp. 1-21.
Office Communication for U.S. Appl. No. 15/671,060 dated May 8, 2019, pp. 1-19.
Office Communication for U.S. Appl. No. 16/113,442 dated Jun. 5, 2019, pp. 1-8.
Office Communication for U.S. Appl. No. 15/891,273 dated May 28, 2019, pp. 1-14.
Office Communication for U.S. Appl. No. 16/107,509 dated Apr. 1, 2019, pp. 1-21.
Office Communication for U.S. Appl. No. 16/048,939 dated Jun. 20, 2019, pp. 1-8.
Office Communication for U.S. Appl. No. 16/100,116 dated May 30, 2019, pp. 1-5.
Office Communication for U.S. Appl. No. 16/384,574 dated May 31, 2019, pp. 1-12.
Office Communication for U.S. Appl. No. 16/107,509 dated Jun. 14, 2019, pp. 1-5.
Office Communication for U.S. Appl. No. 16/107,509 dated Aug. 21, 2019, pp. 1-25.
Office Communication for U.S. Appl. No. 16/384,574 dated Oct. 8, 2019, pp. 1-13.
Office Communication for U.S. Appl. No. 16/543,243 dated Sep. 27, 2019, pp. 1-24.
Office Communication for U.S. Appl. No. 16/048,939 dated Dec. 5, 2019, pp. 1-9.
Office Communication for U.S. Appl. No. 16/565,109 dated Nov. 27, 2019, pp. 1-18.
Office Communication for U.S. Appl. No. 16/525,290 dated Oct. 31, 2019, pp. 1-9.
Office Communication for U.S. Appl. No. 16/532,275 dated Oct. 24, 2019, pp. 1-29.
Office Communication for U.S. Appl. No. 16/560,886 dated Dec. 6, 2019, pp. 1-17.
Office Communication for U.S. Appl. No. 14/500,893 dated Feb. 18, 2015, pp. 1-11.
Office Communication for U.S. Appl. No. 14/518,996 dated Apr. 20, 2015, pp. 1-37.
Office Communication for U.S. Appl. No. 14/500,893 dated Jun. 15, 2015, pp. 1-12.
Office Communication for U.S. Appl. No. 14/518,996 dated Jul. 21, 2015, pp. 1-17.
Office Communication for U.S. Appl. No. 14/695,690 dated Sep. 9, 2015, pp. 1-41.
Office Communication for U.S. Appl. No. 14/695,690 dated Feb. 24, 2016, pp. 1-11.
Office Communication for U.S. Appl. No. 15/150,354 dated Jul. 5, 2016, pp. 1-18.
Mozilla Developer Network, "NSS Key Log Format," https://developer.mozilla.org/en-US/docs/Mozilla/Projects/NSS/Key_Log_Format, Jan. 3, 2010, p. 1.
Extended European Search Report for European Application No. 16166907.2 dated Sep. 30, 2016, pp. 1-7.
Office Communication for U.S. Appl. No. 15/150,354 dated Feb. 8, 2017, pp. 1-3.
Office Communication for U.S. Appl. No. 15/466,248 dated Jun. 5, 2017, pp. 1-30.
Office Communication for U.S. Appl. No. 15/466,248 dated Oct. 3, 2017, pp. 1-34.
Office Communication for U.S. Appl. No. 15/457,886 dated Jan. 5, 2018, pp. 1-11.
Office Communication for U.S. Appl. No. 15/466,248 dated Jan. 11, 2013, pp. 1-2.
Examination Report for European Patent Application No. 16166907.2 dated Mar. 9, 2018, pp. 1-4.
Shaver, Jim, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Office Communication for U.S. Appl. No. 15/466,248 dated Mar. 8, 2018, pp. 1-34.
Office Communication for U.S. Appl. No. 15/457,886 dated Jul. 18, 2018, pp. 1-11.
Office Communication for U.S. Appl. No. 15/466,248 dated Jul. 11, 2018, pp. 1-31.

(56) References Cited

OTHER PUBLICATIONS

International Search Report and Written Opinion for International Patent Application No. PCT/US2017/068585 dated Jul. 4, 2018, pp. 1-11.
Extended European Search Report for European Patent Application No. 17210995.1 dated Jul. 6, 2018, pp. 1-11.
Office Communication for U.S. Appl. No. 15/466,248 dated Oct. 18, 2018, pp. 1-31.
Office Communication for U.S. Appl. No. 15/457,886 dated Mar. 20, 2019, pp. 1-9.
Office Communication for U.S. Appl. No. 15/466,248 dated May 16, 2019, pp. 1-33.
Office Communication for U.S. Appl. No. 15/466,248 dated Sep. 10, 2019, pp. 1-27.
Office Communication for U.S. Appl. No. 15/971,843 dated Oct. 22, 2019, pp. 1-15.
Office Communication for U.S. Appl. No. 14/750,905 dated Sep. 22, 2015, pp. 1-12.
Office Communication for U.S. Appl. No. 14/750,905 dated Jan. 19, 2016, pp. 1-5.
Office Communication for U.S. Appl. No. 15/082,925 dated Sep. 13, 2016, pp. 1-7.
Office Communication for U.S. Appl. No. 15/289,760 dated Dec. 12, 2016, pp. 1-12.
Office Communication for U.S. Appl. No. 15/219,016 dated Nov. 22, 2016, pp. 1-12.
Office Communication for U.S. Appl. No. 15/356,381 dated Jan. 6, 2017, pp. 1-57.
Office Communication for U.S. Appl. No. 15/082,925 dated Feb. 1, 2017, pp. 1-6.
Office Communication for U.S. Appl. No. 15/219,016 dated Mar. 16, 2017, pp. 1-9.
Office Communication for U.S. Appl. No. 15/443,868 dated Apr. 27, 2017, pp. 1-7.
Office Communication for U.S. Appl. No. 15/585,887 dated Jun. 27, 2017, pp. 1-24.
Office Communication for U.S. Appl. No. 15/356,381 dated Jul. 3, 2017, pp. 1-21.
Office Communication for U.S. Appl. No. 15/675,216 dated Jun. 7, 2018, pp. 1-4.
Office Communication for U.S. Appl. No. 15/443,868 dated Aug. 11, 2017, pp. 1-11.
Office Communication for U.S. Appl. No. 15/675,216 dated Nov. 20, 2017, pp. 1-7.
Office Communication for U.S. Appl. No. 15/585,887 dated Nov. 28, 2017, pp. 1-23.
International Search Report and Written Opinion for International Patent Application No. PCT/US2018/030145 dated Aug. 10, 2018, pp. 1-12.
Svoboda, Jakub, "Network Traffic Analysis with Deep Packet inspection Method," Masaryk University, Faculty of Informatics, Master's Thesis, 2014, pp. 1-74.
International Search Report and Written Opinion for International Patent Application No. PCT/US2017/068586 dated Aug. 9, 2018, pp. 1-14.
Extended European Search Report for European Patent Application No. 17210996.9 dated Jun. 13, 2018, pp. 1-7.
Office Communication for U.S. Appl. No. 15/855,769 dated Feb. 5, 2019, pp. 1-10.
Office Communication for U.S. Appl. No. 15/855,769 dated May 1, 2019; pp. 1-7.
Office Communication for U.S. Appl. No. 16/459,472 dated Aug. 14, 2019, pp. 1-15.
Office Communication for U.S. Appl. No. 15/585,887 dated Mar. 20, 2019, pp. 1-26.
Office Communication for U.S. Appl. No. 15/675,216 dated Aug. 28, 2018, pp. 1-14.
Office Communication for U.S. Appl. No. 15/675,216 dated Jan. 29, 2019, pp. 1-8.
Office Communication for U.S. Appl. No. 16/384,697 dated May 30, 2019, pp. 1-12.
Office Communication for U.S. Appl. No. 16/384,574 dated Jan. 13, 2020, pp. 1-9.
Office Communication for U.S. Appl. No. 16/107,509 dated Jan. 23, 2020, pp. 1-12.
Office Communication for U.S. Appl. No. 15/585,887 dated Jan. 22, 2020, pp. 1-28.
Office Communication for U.S. Appl. No. 16/384,697 dated Oct. 17, 2019, pp. 1-3.
Office Communication for U.S. Appl. No. 16/459,472 dated Feb. 3, 2020, pp. 1-7.
Office Communication for U.S. Appl. No. 16/679,055 dated Feb. 14, 2020, pp. 1-32.
Office Communication for U.S. Appl. No. 16/048,939 dated Feb. 18, 2020, pp. 1-6.
Office Communication for U.S. Appl. No. 16/424,387 dated Feb. 24, 2020, pp. 1-15.
Office Communication for U.S. Appl. No. 16/718,050 dated Feb. 27, 2020, pp. 1-21.
Wade, Susan Marie, ""Scala Honeynets: The attractiveness of honeypots as critical infrastructure security tools for the detection and analysis of advanced threats"" (2011). Graduate Theses and Dissertations. 12138. https://lib.dr.lastate.edu/etd/12138, pp. 1-67.
Office Communication for U.S. Appl. No. 16/525,290 dated Mar. 12, 2020, pp. 1-10.
Office Communication for U.S. Appl. No. 15/971,843 dated Mar. 26, 2020, pp. 1-14.
Office Communication for U.S. Appl. No. 16/048,939 dated Mar. 26, 2020, pp. 1-6.
Office Communication for U.S. Appl. No. 16/543,243 dated Apr. 7, 2020, pp. 1-22.
Office Communication for U.S. Appl. No. 16/532,275 dated Apr. 20, 2020, pp. 1-8.
Office Communication for U.S. Appl. No. 16/560,886 dated Apr. 22, 2020, pp. 1-10.
Office Communication for U.S. Appl. No. 16/565,109 dated May 8, 2020, pp. 1-19.
Examination Report for European Patent Application No. 16166907.2 dated Dec. 19, 2019, pp. 1-6.
Examination Report for European Patent Application No. 17210996.9 dated May 27, 2020, pp. 1-3.
Office Communication for U.S. Appl. No. 15/585,887 dated Aug. 28, 2020, pp. 1-30.
Office Communication for U.S. Appl. No. 16/679,055 dated Sep. 4, 2020, pp. 1-5.
Office Communication for U.S. Appl. No. 16/718,050 dated Sep. 4, 2020, pp. 1-23.
Office Communication for U.S. Appl. No. 16/525,290 dated Sep. 23, 2020, pp. 1-10.
International Search Report and Written Opinion for International Patent Application No. PCT/US2019/030015 dated Aug. 7, 2019, pp. 1-6.
International Search Report and Written Opinion for International Patent Application No. PCT/US2019/018097 dated May 28, 2019, pp. 1-9.
Office Communication for U.S. Appl. No. 15/971,843 dated Oct. 27, 2020, pp. 1-11.
Office Communication for U.S. Appl. No. 16/424,387 dated Nov. 24, 2020, pp. 1-23.
Office Communication for U.S. Appl. No. 16/543,243 dated Dec. 16, 2020, pp. 1-13.
Office Communication for U.S. Appl. No. 16/565,109 dated Jan. 19, 2021, pp. 1-9.
Office Communication for U.S. Appl. No. 16/813,649 dated Feb. 24, 2021, pp. 1-7.
Office Communication for U.S. Appl. No. 16/679,055 dated Mar. 16, 2021, pp. 1-33.
Office Communication for U.S. Appl. No. 15/585,887 dated Mar. 26, 2021, pp. 1-31.
Office Communication for U.S. Appl. No. 16/525,290 dated Mar. 31, 2021, pp. 1-11.

(56) References Cited

OTHER PUBLICATIONS

Office Communication for U.S. Appl. No. 15/971,843 dated May 5, 2021, pp. 1-9.
Office Communication for U.S. Appl. No. 16/820,582 dated May 10, 2021, pp. 1-24.
Office Communication for U.S. Appl. No. 16/525,290 dated Jun. 15, 2021, pp. 1-4.
Office Communication for U.S. Appl. No. 16/174,051 dated Jan. 19, 2019, pp. 1-21.
Extended European Search Report for European Patent Application No. 16166907.2 dated Sep. 30, 2016, pp. 1-7.
Office Communication for U.S. Appl. No. 15/150,354 dated Feb. 8, 2017, pp. 1-8.
Office Communication for U.S. Appl. No. 15/466,248 dated Jan. 11, 2018, pp. 1-2.
Office Communication for U.S. Appl. No. 16/384,574 dataed Jan. 13, 2020, pp. 1-9.
Office Communication for U.S. Appl. No. 16/384,697 dated Oct. 17, 2019, pp. 1-8.
Examination Report for European Patent Application No. 17210996.9 dated May 21, 2021, pp. 1-6.
Office Communication for U.S. Appl. No. 16/525,290 dated Jul. 9, 2021, pp. 1-7.
Office Communication for U.S. Appl. No. 16/679,055 dated Jul. 26, 2021, pp. 1-34.
Office Communication for U.S. Appl. No. 16/718,050 dated Jul. 27, 2021, pp. 1-23.
Office Communication for U.S. Appl. No. 15/971,843 dated Jul. 28, 2021, pp. 1-9.
Office Communication for U.S. Appl. No. 15/585,887 dated Aug. 17, 2021, pp. 1-41.
Office Communication for U.S. Appl. No. 15/585,887 dated Nov. 2, 2021, pp. 1-4.
Office Communication for U.S. Appl. No. 16/679,055 dated Nov. 12, 2021, pp. 1-34.
Office Communication for U.S. Appl. No. 17/483,435 dated Nov. 30, 2021, pp. 1-21.
Office Communication for U.S. Appl. No. 17/483,148 dated Dec. 13, 2021, pp. 1-28.
Office Communication for U.S. Appl. No. 16/813,649 dated Dec. 20, 2021, pp. 1-44.
Office Communication for U.S. Appl. No. 17/226,947 dated Dec. 30, 2021, pp. 1-6.
Office Communication for U.S. Appl. No. 16/820,582 dated Jan. 14, 2022, pp. 1-13.
Office Communication for U.S. Appl. No. 16/989,025 dated Jan. 19, 2022, pp. 1-12.
Office Communication for U.S. Appl. No. 16/820,582 dated Sep. 27, 2021, pp. 1-25.
Office Communication for U.S. Appl. No. 16/679,055 dated Oct. 12, 2021, pp. 1-3.
Office Communication for U.S. Appl. No. 17/351,866 dated Oct. 18, 2021, pp. 1-12.
Supplementary European Search Report for European Patent Application No. 19804040.4 dated Jan. 25, 2022, pp. 1-4.
Office Communication for U.S. Appl. No. 17/351,866 dated Feb. 9, 2022, pp. 1-9.
International Search Report and Written Opinion for International Patent Application No. PCT/US2021/051757 dated Jan. 11, 2022, pp. 1-9.
"Kerberos Overview—An Authentication Service for Open Network Systems," Cisco Systems, Inc., Jan. 19, 2006, https://www.cisco.com/c/en/us/support/docs/security-vpn/kerberos/16037-1.html, Accessed: Feb. 9, 2022, pp. 1-16.

* cited by examiner

CORRELATING NETWORK TRAFFIC THAT CROSSES OPAQUE ENDPOINTS

CROSS-REFERENCE TO RELATED APPLICATION(S)

This Utility patent application is a Continuation-in-Part of U.S. patent application Ser. No. 16/989,025 filed on Aug. 10, 2020, which is a Continuation of U.S. patent application Ser. No. 16/532,275 filed on Aug. 5, 2019, now U.S. Pat. No. 10,742,530 issued on Aug. 11, 2020, the contents of which are each further incorporated in entirety by reference.

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

In complex networks, monitoring network traffic may be pass through one or more endpoints or services that modify some or all of the network traffic deliberately or by design. These modifications may interfere with monitory activity occurring in the monitored networks. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
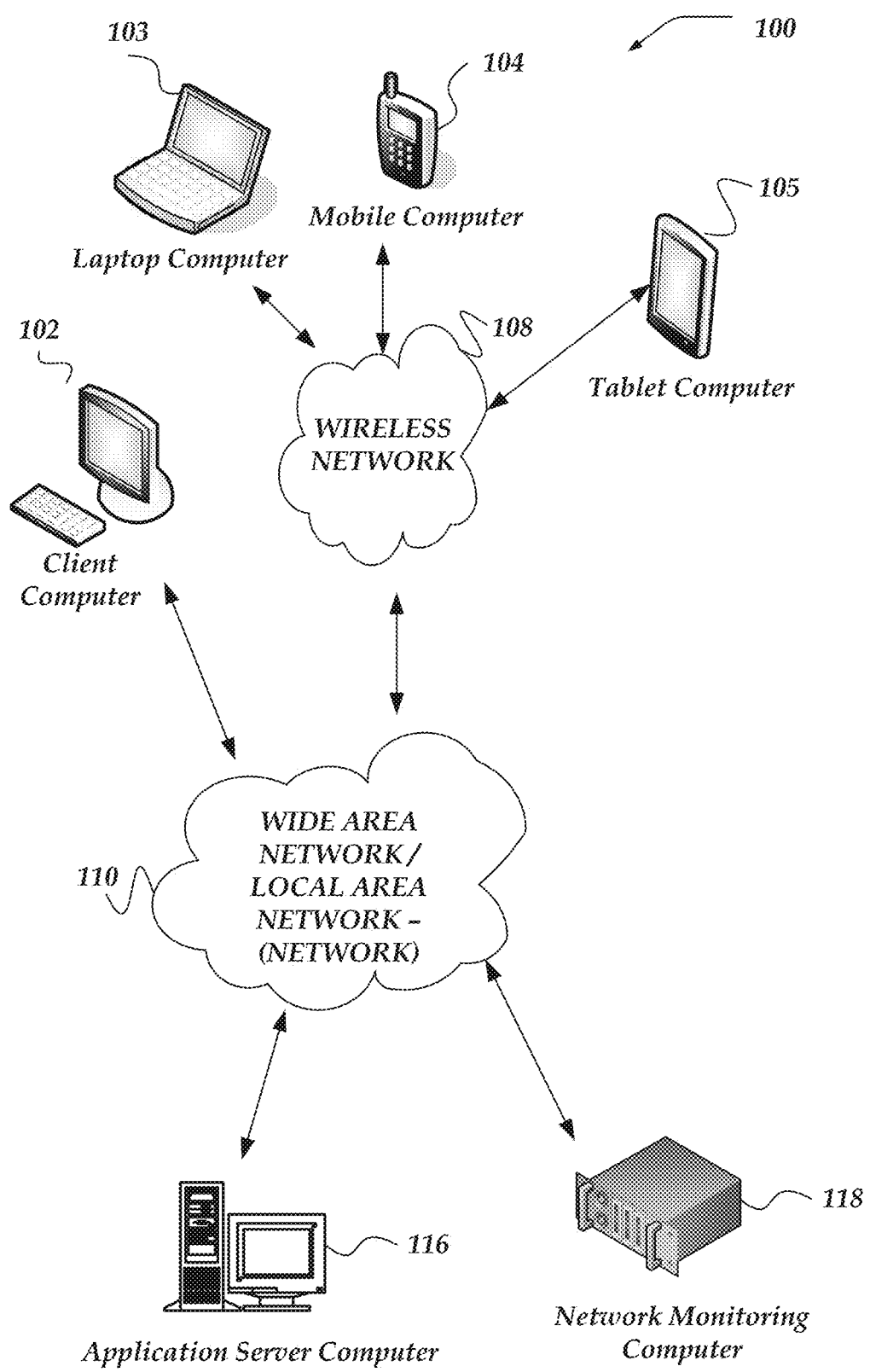
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "endpoint" refers to a service, application, computer, device, interface, or the like, that terminates a network connection. In some cases, one computer, device, interface, or the like, may provide more than one endpoint each associated with different services or applications. Likewise, more than one endpoint may be associated with the same network address. For example, service A and service B may each provide an endpoint at the same network address by using different ports, or the like.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like. In cases, related flows may be flows in different networks or network segments that may be associated the same user, application, client computer, source, destination, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiments, the NMC may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (out-of-band) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, inter-networking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein the term, "opaque endpoint" refers to a device or computer that may obscure the source of network traffic that passes through or seemingly originates from the device or computer. In some cases, opaque endpoints may include devices such as firewalls, load balancers, routers, network gateways, proxies, or the like, that intentionally obscure the source of network traffic by design. Also, in some cases, an opaque endpoint may include device or computers that may maliciously or inadvertently obscure the source of network traffic, such as, a compromised workstation or laptop computer in an otherwise secure network environment. Further, obscuring the source of network traffic may include masking, modifying or replacing portions of the network traffic. For example, masking, modifying or replacing portions of the network traffic may include, altering header information, altering tuple information, wrapping the original network traffic (e.g., tunneling), redirecting/forwarding network traffic, network address translation, or the like, or combination thereof.

As used herein the term, "virtual private network (VPN) gateway" refers to computer, services, or devices, that enable external endpoints to establish secure network tunnels that enable the external endpoints to join protected networks. Typically, VPN gateways enable external clients to establish a local gateway that transparently and securely routes network traffic between the external client and computers, services, or devices in the protected network. VPN gateways may map external network addresses that are accessible from outside the protected network to internal network addresses that enable the external clients to appear to be in the protected network. Also, in some cases, VPN gateways may be physical edge devices or virtualized services in on premises networking environments or cloud computing environments. Further, in some cases, VPN gateways may be referred to as VPN routers.

As used herein, the term "traffic forwarding device (TFD)" refers to a hardware or software network device that among things may forward network traffic from endpoints in one network or network segment to endpoints in another network or network segment. TFDs may be complex/multifunction network devices that may perform additional actions, operations, transformations, traffic management, or the like, of the forwarded network traffic. For example, TFDs may include devices such as VPN gateways, network bridges, firewalls, proxies, routers, or the like.

As used herein, the terms "network traffic turn," and "turn" refer to the instant when a network traffic changes direction. NMCs may be arranged to implement traffic analysis that includes turn detection. Turn detection may include analyzing monitored network traffic associated with flows or network addresses to determine if data is primarily flowing in one direction (e.g., from network endpoint A to network endpoint B) followed by data flowing in the other direction (e.g., from network endpoint B to network endpoint A). This change of direction may, for some protocols, indicate a request-response pattern. For such protocols, every other turn may correspond to a new transaction. If a turn is detected, the NMC may be arranged to search for a known sequence or pattern that corresponds to the protocol request or response at the beginning of the turn. NMCs may be configured to use various metrics for identifying a turn, such as, changes in network traffic rate, changes in traffic flow value, sequence matching, response delay/latency, or the like, or combination thereof. Accordingly, one or more threshold values may be configured for detecting turns. Also, knowledge of the particular protocol, application, or the like, may be employed using rules/conditions to help detect turns. In some embodiments, one or more metrics, threshold values, rules, or the like, may be combined together to provide heuristics that may be used for detecting turns.

As used herein the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed monitoring network traffic using one or more network monitoring computers. In one or more of the various embodiments, two or more network segments that may be coupled by a traffic forwarding device (TFD) may be monitored. In one or more of the various embodiments, the TFD may include one or more of a virtual private network gateway or network traffic proxy.

In one or more of the various embodiments, one or more external network addresses and one or more internal network addresses or endpoints may be determined based on encrypted network traffic exchanged between one or more external endpoints and the TFD and internal network traffic exchanged between one or more internal endpoints and the TFD.

In one or more of the various embodiments, one or more metrics associated with the one or more external network addresses and one or more other metrics associated with the one or more internal network addresses may be determined based on the encrypted network traffic and the internal network traffic.

In one or more of the various embodiments, one or more correlation scores may be provided for the one or more external network addresses and the one or more internal network addresses based on one or more of a correlation model, the one or more metrics, or the one or more other metrics.

In one or more of the various embodiments, in response to a correlation score associated with an external network address and an internal network address exceeding a threshold value, further actions may be performed, including: associating the external network address and the internal network address with each other based on the correlation score; and providing a report that includes information about the association of the external network address with the internal network address.

In one or more of the various embodiments, a first metric associated with each of the one or more external network addresses based on a first amount of the encrypted network traffic sent from each external network address may be determined. In some embodiments, a second metric associated with each of the one or more external network addresses based on a second amount of the encrypted network traffic received by each external network address may be determined. In some embodiments, a third metric associated with each of the one or more internal network addresses may be determined based on a third amount of the internal network traffic sent from each internal network address. In some embodiments, a fourth metric associated with each of the one or more internal network addresses may be determined based on a fourth amount of the internal network traffic received by each internal network address. And, in some embodiments, the one or more correlation scores may be updated based on one or more similarities between the two or more of the first metric, the second metric, the third metric, or the fourth metric over a time interval.

In one or more of the various embodiments, one or more turns occurring on the encrypted network traffic may be determined based on identifying a change of direction of the encrypted network traffic such that the change of direction may be indicated by the one or more metrics. In some embodiments, one or more other turns occurring on the internal network traffic may be determined based on identifying a change of direction of the internal network traffic such that the change of direction is indicated by the one or more other metrics. And, in some embodiments, the one or more correlation scores for the one or more external network addresses and the one or more internal network addresses based on one or more similarities of the one or more turns and the one or more other turns.

In one or more of the various embodiments, one or more internal services that may be associated with one or more portions of the internal network traffic associated with the internal network address may be determined based on the one or more characteristics of the internal network traffic associated with the internal network address. In some embodiments, the one or more internal services may be associated with the external network address. And, in some embodiments, information about the one or more internal services may be included in the report.

In one or more of the various embodiments, information associated with one or more metrics associated with the one or more external network addresses may be progressively updated based on monitoring the encrypted network traffic in the one or more network segments. In some embodiments, other information associated with one or more other metrics associated with the one or more internal network addresses may be progressively updated based on monitoring the internal network traffic in the one or more other network segments. And, in some embodiments, the correlation score may be updated based on the updated information and the updated other information.

Further, in one or more of the various embodiments, two or more network segments that are coupled by one or more traffic forwarding devices may be monitored by one or more NMCs such that the one or more traffic forwarding devices may be arranged to modify network traffic passed from one network segment to another network segment. In one or more of the various embodiments, modification to the network traffic may include obscuring one or more characteristics of the network traffic passed between network segments, including one or more of source tuple information, destination tuple information, sequence numbers, protocol header fields, payload content, or the like.

In one or more of the various embodiments, one or more flows in one or more network segments may be determined based on monitored network traffic associated with the one or more network segments.

In one or more of the various embodiments, one or more other flows in one or more other network segments may be determined based on other monitored network traffic associated with the one or more other network segments.

In one or more of the various embodiments, a correlation score for two or more flows that are in different network segments may be provided based on one or more of a correlation model, a characteristic of the one or more flows, another characteristic of the one or more other flows, or the like.

In one or more of the various embodiments, two or more related flows may be determined based on a value of the correlation score of the two or more related flows such that the two or more related flows are located in different network segments.

In one or more of the various embodiments, a report that includes information about the two or more related flows may be provided.

In one or more of the various embodiments, one or more timing characteristics associated with the one or more flows in the one or more network segments may be modified. In some embodiments, the one or more other flows in the one or more other network segments may be determined based on the one or more modified timing characteristics. And, in some embodiments, the correlation score for the two or more flows may be updated based on the modified timing characteristics.

In one or more of the various embodiments, the network traffic associated with the one or more flows in the one or more network segments may be modified to include fingerprint information such that the fingerprint information may be passed by the one or more traffic forwarding devices from the one or more network segments to the one or more other network segments. Accordingly, in some embodiments, the one or more other flows in the one or more other network segments may be determined based on the fingerprint information. And, in some embodiments, the correlation score for the two or more flows may be updated based on the fingerprint information.

In one or more of the various embodiments, one or more transactions associated with the one or more flows in the one or more network segments may be determined based on one or more characteristics of the one or more flows such that information associated with the one or more transactions may be included in network traffic in the one or more network segments and other network traffic is included in the one or more other network segments. In some embodiments, the one or more other flows in the one or more other network segments may be determined based on the one or more transactions. And, in some embodiments, the correlation score for the two or more flows may be updated based on the one or more transactions.

In one or more of the various embodiments, one or more control flows in the one or more network segments may be determined based on one or more characteristics of the one or more control flows. Accordingly, in some embodiments, one or more content flows in the one or more other network segments may be determined based on one or more characteristics of the one or more content flows. And, in some embodiments, the correlation score for the one or more control flows and the one or more content flows may be updated.

In one or more of the various embodiments, information associated with one or more characteristics of the one or more flows may be progressively updated based on monitoring the network traffic in the one or more network segments. Also, in one or more of the various embodiments, other information associated with one or more other characteristics of the one or more other flows may be progressively updated based on monitoring other network traffic in the one or more other network segments. And, in some embodiments, the correlation score may be updated based on the updated information and the updated other information.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF)

devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
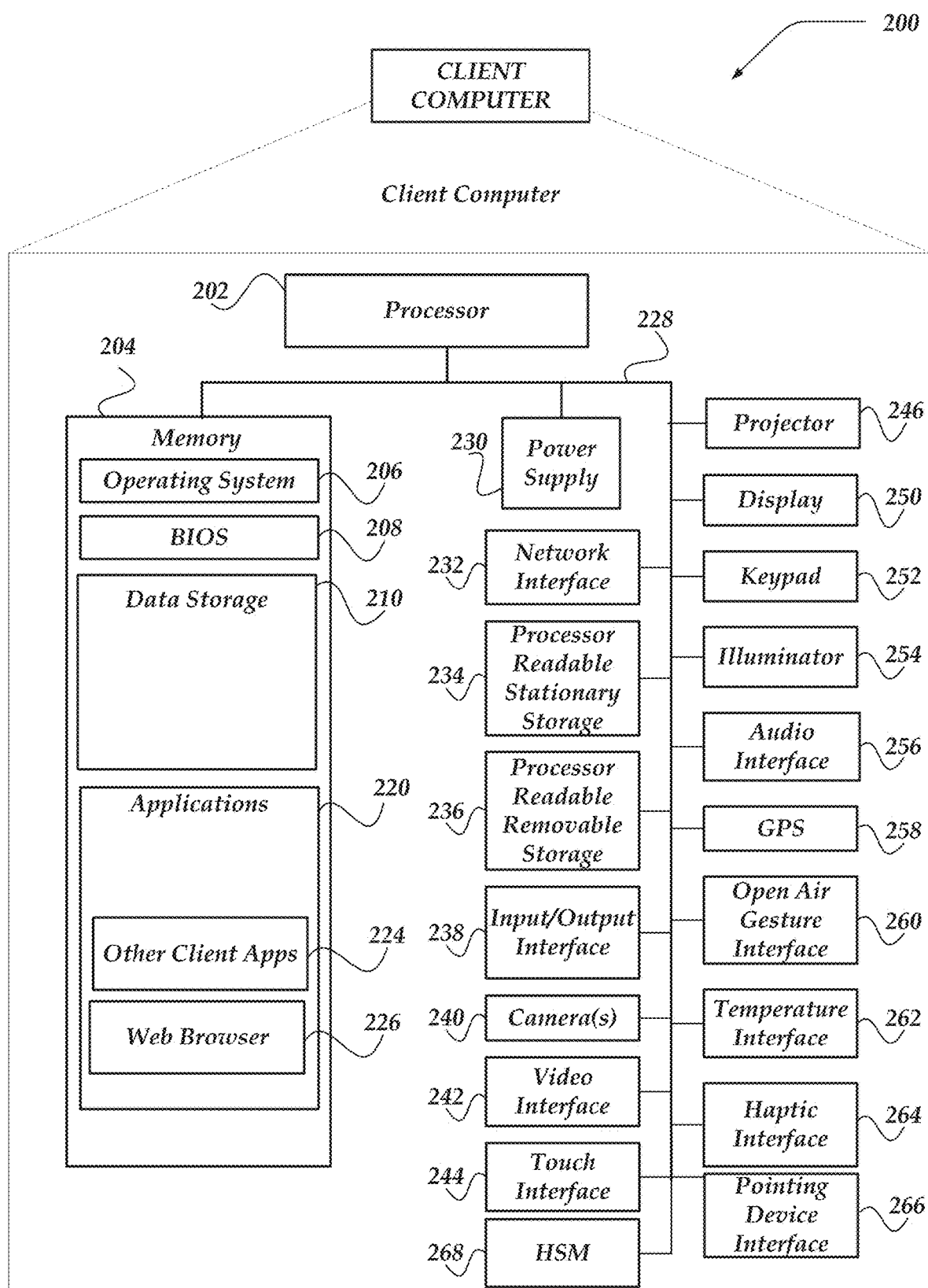
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the micro-controllers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
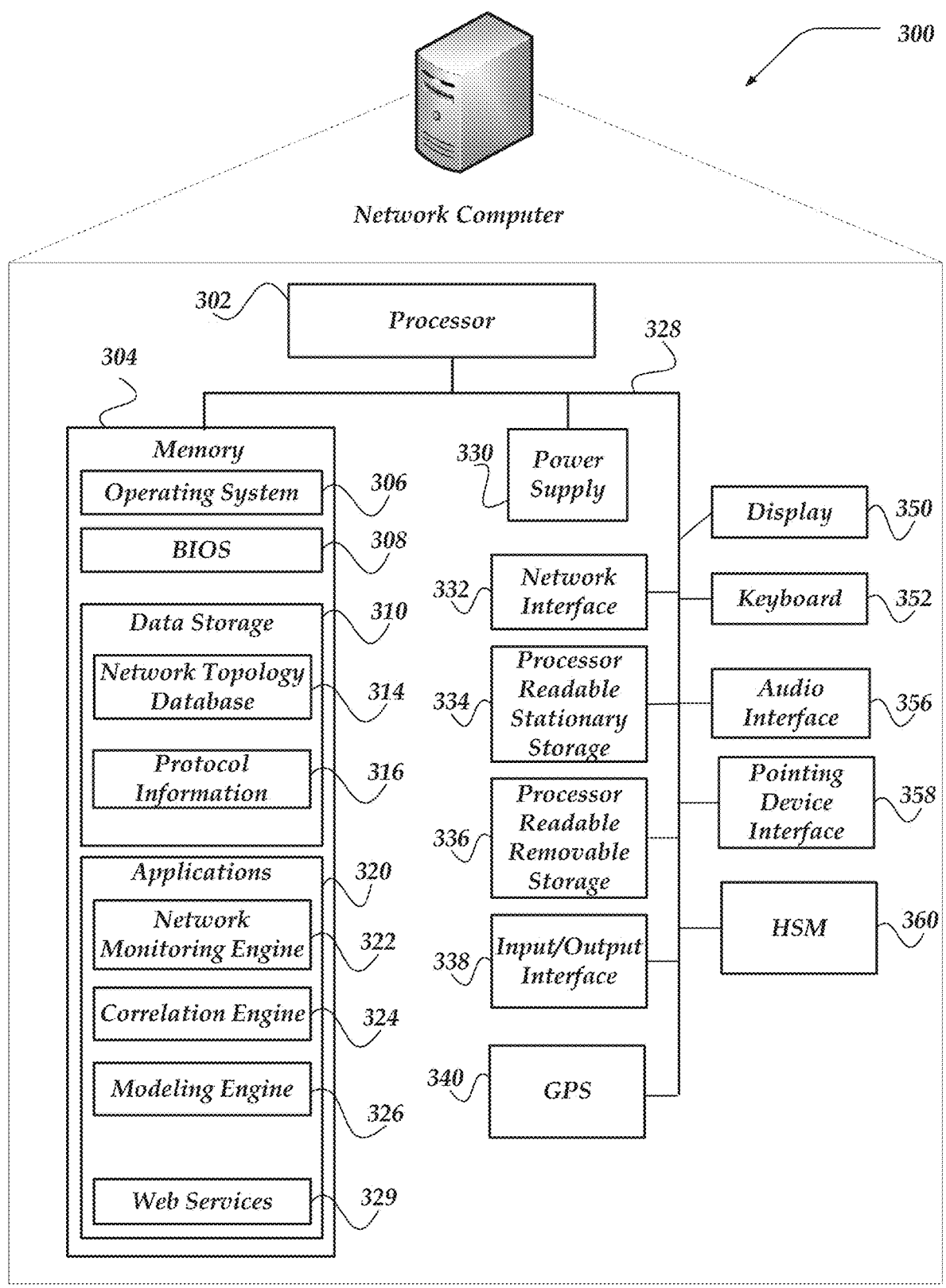
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, correlation engine 324, modeling engine 326, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, network topology database 314, protocol information 316, or the like. In some embodiments, network topology database 314 may be a data store that contains information related to the topology of one or more network monitored by a NMC, including one or more device relation models. And, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment. Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, correlation engine 324, modeling engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, correlation engine 324, modeling engine 326, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, correlation engine 324, modeling engine 326, web services 329, or the like, may be provisioned and de-commissioned automatically.

Also, in one or more of the various embodiments, network monitoring engine 322, correlation engine 324, modeling engine 326, web services 329, or the like, may be located in virtual servers running in a cloud-based computing environment rather than being tied to one or more specific physical network computers. Likewise, in some embodiments, one or more of network monitoring engine 322, correlation engine 324, modeling engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
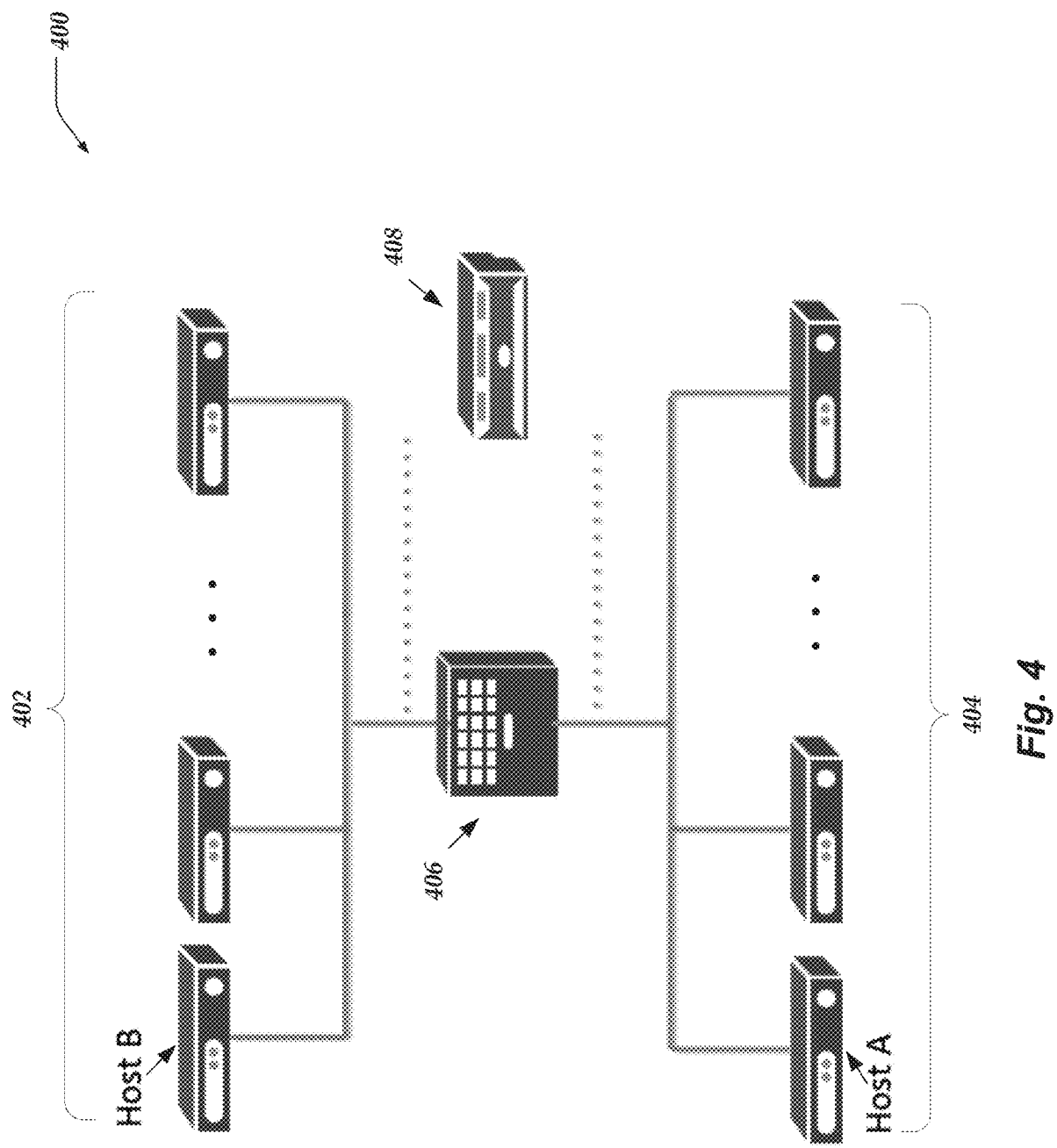
FIG. 4 illustrates a logical architecture of a system for correlating network traffic that crosses opaque endpoints in accordance with one or more of the various embodiments.

FIG. 4 illustrates a logical architecture of system 400 for correlating network traffic that crosses opaque endpoints in accordance with one or more of the various embodiments. System 400 may be arranged to include a plurality of network devices or network computers on first network 402 and a plurality of network devices or network computers on second network 404. In this example. communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

Figure 5:
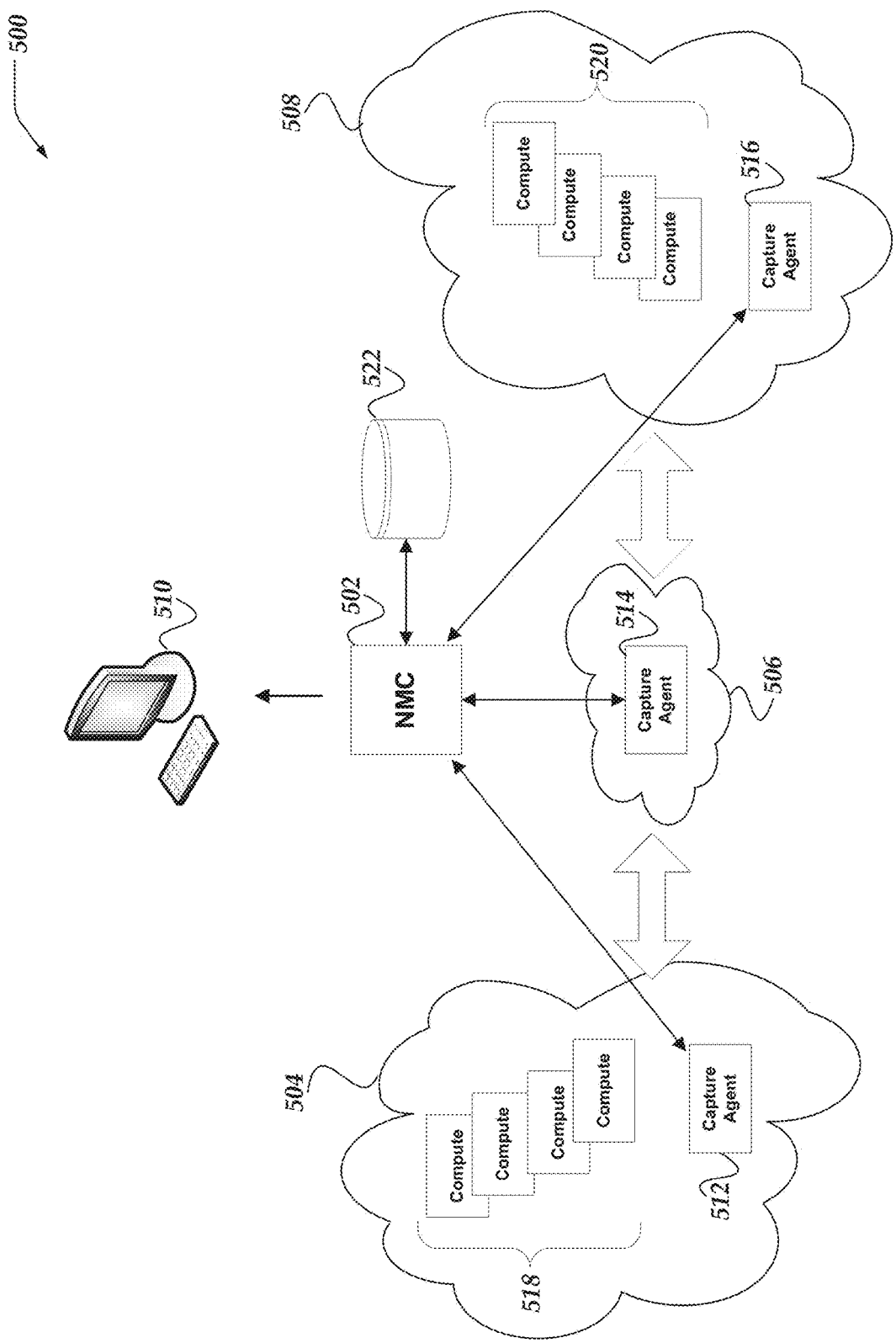
FIG. 5 illustrates a logical schematic of a system for correlating network traffic that crosses opaque endpoints in accordance with one or more of the various embodiments.

FIG. 5 illustrates a logical schematic of system 500 for correlating network traffic that crosses opaque endpoints in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that are distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters pf similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522.

Figure 6A:
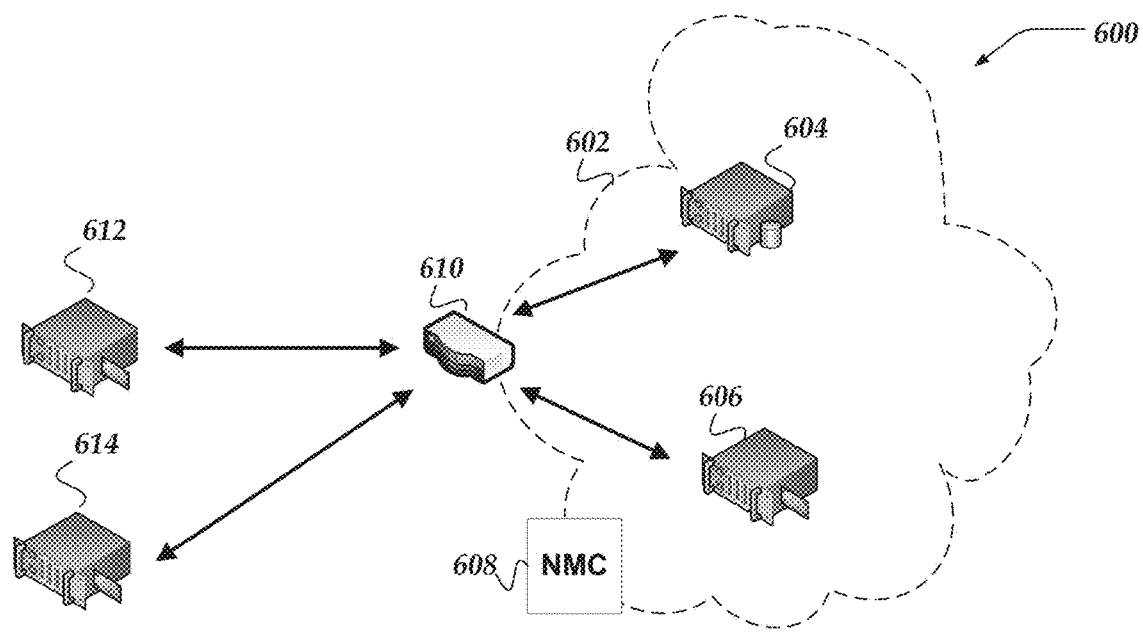
FIG. 6A illustrates a logical schematic of a system for correlating network traffic that crosses opaque endpoints in accordance with one or more of the various embodiments.

FIG. 6A illustrates a logical schematic of system 600 for correlating network traffic that crosses opaque endpoints in accordance with one or more of the various embodiments. In some embodiments, a network, such as, network 602 may be arranged to include various entities, such as, computers, devices, services, or the like. In this example, for some embodiments, network computer 604, network computer 606 may represent computers inside network 602. In this example, network 602 may be configured such that its internal entities may be inaccessible to other entities (e.g., computers, services, devices, or the like) unless the communication originates in network 602. In this example, network computer 612 and network computer 614 may represent entities that are not in network 602.

Accordingly, edge devices, such as, edge device 610 may be arranged to provide entities outside of network 602 access to some or all of the entities inside network 602. In some embodiments, edge devices may include hardware or software implementations of NAT devices, firewalls, load balances, routers, proxies, or the like. In some embodiments, a common characteristic of edge devices, such as, edge device 610 may include providing a network endpoint that receives network traffic that it transforms and forwards to another endpoints. For example, edge device 610 may be arranged to perform network address translation (NAT) to enable devices outside of network 602 to reach devices inside network 602. In some embodiments, the NAT operation may modify the network traffic from the "external" devices to enable that traffic reach devices inside other networks, such as, network 602.

In one or more of the various embodiments, edge devices, such as edge device 610 may modify portions of the incoming network traffic. In some cases, these modifications may include deliberately modifying portions of the network traffic that enable its source/origination to be easily identified. In some embodiments, edge devices, such as, edge device 610 may be arranged to transform network address information (e.g., tuple information) in ways that may obscure the source of the traffic. Accordingly, in one or more of the various embodiments, it may be difficult or impossible for conventional network tools to correlate network traffic flowing through one network (or network segment) with network traffic in other networks (or network segments) even though the network traffic may be part of the same communication session or transaction. For example, in some embodiments, address translation may modify critical protocol header fields such that a conventional monitor may be unable to determine the original source of the traffic.

As described above, in one or more of the various embodiments, NMCs, such as, NMC 608 may be arranged to passively monitor network traffic that occurs inside network 602 as well as traffic that arrives at edge device 610. In some embodiments, there may be more than one NMC, such that one or more NMCs may be arranged to monitor network traffic inside network 602 and one or more NMCs that may be arranged to monitor network traffic that occurs outside of network 602. Note, the capability for NMC 608 to be configured to simultaneously monitor internal network traffic and external network traffic is represented here by illustrating NMC 608 as spanning the boundary of network 602.

Accordingly, in one or more of the various embodiments, NMCs, such as, NMC 608 may be arranged to perform various actions to correlate network traffic outside of network 602 with network traffic inside network 602. Accordingly, in one or more of the various embodiments, NMCs may be arranged to correlate network traffic flows (flows) occurring outside of network 602 with flows inside network 602.

In one or more of the various embodiments, NMCs may be arranged to monitor flows in two or more networks or network segments and correlate them based on various characteristics of the network traffic comprising the flows. Accordingly, in one or more of the various embodiments, NMCs may be arranged to collect various metrics that may be associated with various flows in the monitored networks. In some embodiments, NMCs may be arranged to employ the metrics along with various correlation models (not shown) to determine correlation information that may enable flows in one network or network segment to be correlated with flows in other networks or network segments.

Figure 6B:
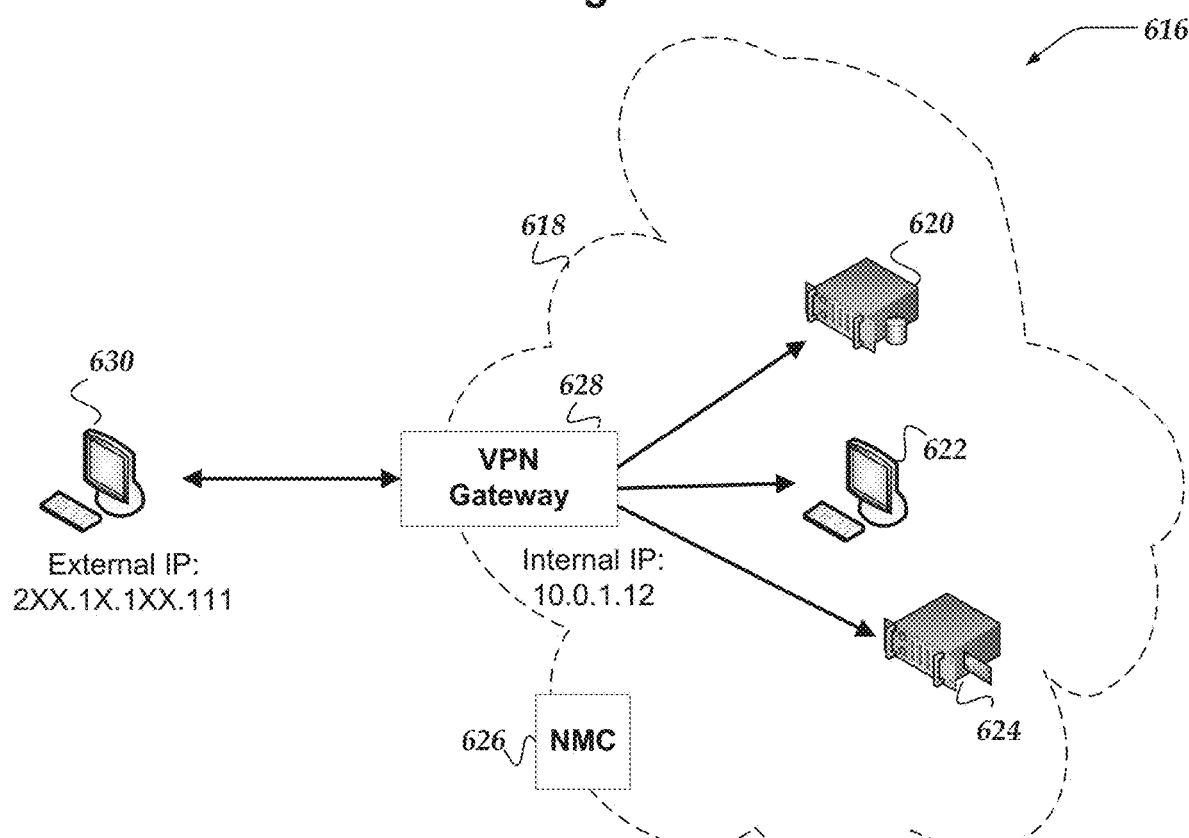
FIG. 6B illustrates a logical schematic of a system for correlating network traffic that crosses opaque endpoints associated with VPN gateways in accordance with one or more of the various embodiments.

FIG. 6B illustrates a logical schematic of system 616 for correlating network traffic that crosses opaque endpoints associated with VPN gateways in accordance with one or more of the various embodiments. In some embodiments, a network, such as, network 618 may be arranged to include various entities, such as, computers, devices, services, or the like. In this example, for some embodiments, network computer 620, workstation (client) computer 622, or network computer 624 may represent computers inside network 618. In this example, network 618 may be configured such that its internal entities may be inaccessible to other entities (e.g., computers, services, devices, or the like) unless the communication originates in network 618. In this example, client computer 630 may represent an endpoint that is not considered to be network 618.

Accordingly, virtual private network (VPN) gateways, such as, VPN gateway 628 may be arranged to provide entities outside of network 628 access to some or all of the entities inside network 618. In some embodiments, VPN gateways may be considered specific hardware or software implementations of VPN gateways, VPN routers, or the like. In some embodiments, VPN gateways, such as, VPN gateway 628 may share one or more characteristics as other edge devices. However, in some embodiments, VPN gateways may be arranged to establish virtual secure encrypted communication between one or more endpoints outside of a network and endpoints within the protected network. Thus, in this example, for some embodiments, the network traffic between client computer 630 and VPN gateway 628 may be considered opaque to NMC 626.

In one or more of the various embodiments, VPN gateways may expose an external network addresses, such as, 93.184.216.34 that computers, services, or devices outside of the protected network may employ to establish connections or otherwise communicate with computer, services, or devices within protected networks, such as, network 618. Further, in some embodiments, VPN gateways, such as, VPN gateway 628 may be configured to provide an internal network address, such as, internal IP: 10.0.1.12 that computer, services, or devices, inside the protected network may employ to communicate with external clients. In some embodiments, VPN gateways may map one or more internally accessible network addresses to one or more external network addresses. While VPN gateways may share some characteristics with other gateways, routers, or the like, unlike most other gateways, routers, or the like, VPN gateways encrypt the network traffic between external computers and the VPN gateway.

Accordingly, in one or more of the various embodiments, the encryption provided by VPN gateways may make it difficult or impossible for conventional network tools to correlate network traffic associated with VPN protected external network addresses with their corresponding internal network addresses.

As described above, in one or more of the various embodiments, NMCs, such as, NMC 626 may be arranged to passively monitor network traffic that occurs inside network 618 as well as traffic that arrives at VPN gateway 628. In some embodiments, there may be more than one NMC, such that one or more NMCs may be arranged to monitor network traffic inside network 618 and one or more NMCs that may be arranged to monitor network traffic that occurs outside of network 618. Note, the capability of NMC 626 to be configured to simultaneously monitor internal network traffic and external network traffic is represented here by illustrating NMC 626 as spanning the boundary of network 618.

Accordingly, in one or more of the various embodiments, NMCs, such as, NMC 626 may be arranged to perform various actions to correlate network traffic associated with network address that may be outside of network 618 with network traffic associated with one or more network addresses inside network 618. Accordingly, in one or more of the various embodiments, NMCs may be arranged to correlate external network addresses associated with VPN gateways with internal network addresses associated with VPN gateways.

Accordingly, in one or more of the various embodiments, NMCs may be arranged to monitor network traffic that exchanged between an external network addresses associated with VPN gateways and monitor network traffic exchanged between internal network addresses associated with VPNs to correlate them based on various characteristics of the monitored network traffic. Accordingly, in one or more of the various embodiments, NMCs may be arranged to collect various metrics that may be associated with the network traffic exchanged over external VPN network addresses and network traffic communicated over internal VPN network addresses. Thus, in some embodiments, NMCs may be arranged to employ the metrics along with various correlation models (not shown) to determine correlation information that may enable external network address associated with VPNs to be correlated with internal network addresses associated with VPNs.

Figure 7:
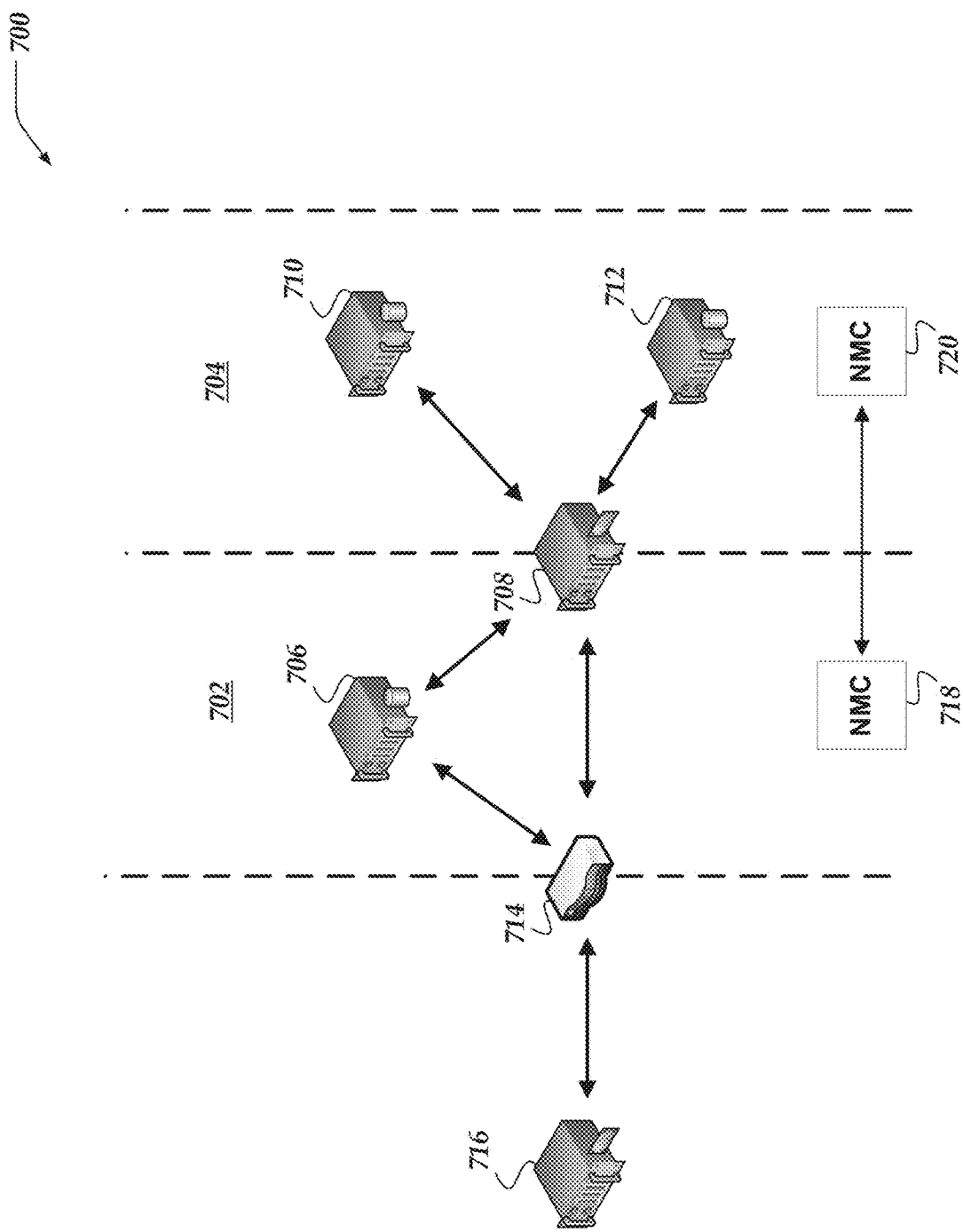
FIG. 7 illustrates a logical schematic of a system for correlating network traffic that crosses opaque endpoints in accordance with one or more of the various embodiments.

FIG. 7 illustrates a logical schematic of system 700 for correlating network traffic that crosses opaque endpoints in accordance with one or more of the various embodiments. In some embodiments, system, such as, system 700 may include two or network segments, such as, network segment 702, network segment 704, or the like. In some embodiments, network segments may be portions of a network that may be configured such that devices in one segment may be disabled from directly communicating with devices in another segment.

In this example, for some embodiments, network computer 706 is in network segment 702 while network computer 710 and network computer 712 may be considered to by network segment 704. Thus, in this example, network computer 706 may be disabled from communicating or otherwise accessing network computer 710 because the two network computers are in different network segment. Note, in some cases, network segments may be configured to enable computers in different network segments to transparently communicate with each other. This example relates to network segments that are configured to restrict direct cross-boundary communications or access.

Accordingly, in one or more of the various embodiments, one or more computers or devices, such as, network computer 708 may be arranged provide a traffic forwarding from one network segment to another network segment. In some embodiments, traffic forwarding devices may be considered similar to edge devices described above except that they may transfer network traffic across internal network segments rather than enabling external devices to access internal networks.

Also, in some embodiments, edge device 714 may be arranged to enable computers from other networks (e.g., the internet) to access devices or services in one or more network segments. In this example, edge device 714 may be configured to enable an outside computer, such as, network computer 716 to access computers in network segment 702. Thus, in this example, edge device 714 may protect or control access to network segment 702 while traffic forwarding device 708 may protect or control access to network segment 704, namely preventing outside computers from directly accessing network segment 704. For example, for some embodiments, outside computer 716 may be disable from accessing any computer in network segment 704 because it cannot access traffic forwarding device 708.

However, in one or more of the various embodiments, outside computers, such as, network computer 716 may pass network traffic through edge device 714 to one or more network computers in network segment 702. Thus, in some circumstances, malicious or otherwise, in order for network traffic from network computer 716 to reach computers in network segment 704, that network traffic must pass through edge device 714 and at least bridge device 708 to reach computers in network segment 704.

In one or more of the various embodiments, as described above, network traffic that passes through devices, such as, edge device 714 may have critical information changed or transformed such that its source may be obscured. Accordingly, in some embodiments, network traffic comprising flows associated with network computer 716 may enter network segment 702 via edge device 714. However, in some embodiments, the actions of edge device 714 may make it difficult for conventional monitoring devices to determine that the source of the flows are network computer 716.

Accordingly, in one or more of the various embodiments, one or more NMCs, such as, NMC 718 or NMC 720 may be arranged to monitor the network traffic in the different network segments to identify various network flows between various entities in the network segments. Further, in some embodiments, the NMCs may be arranged to collect various metrics associated with the flows. In one or more of the various embodiments, the metrics may be used to develop correlation information for correlate flows in one network segment with flows in other network segments.

For example, in some embodiments, while network computer 716 may be disabled from directly accessing network computer 712, it may be enabled to reach network computer 712 indirectly. For example, in some embodiments: network computer 716 may directly reach edge device 714 with one flow; the edge device 714 may create another flow that can reach bridge device 708 (directly or via network computer 706); and bridge device 708 may then create still another flow that may reach network computer 712. So, in this example, through a series of distinct but related flows or proxied flows, network traffic associated with network computer 716 may reach network computer 712. In some embodiments, determining that a flow reaching network computer 712 is associated with a network computer, such as, network computer 716 may be difficult because intervening devices (here at least edge device 714 and bridge device 708) may modify the network traffic originally sent by network computer 716.

Figure 8:
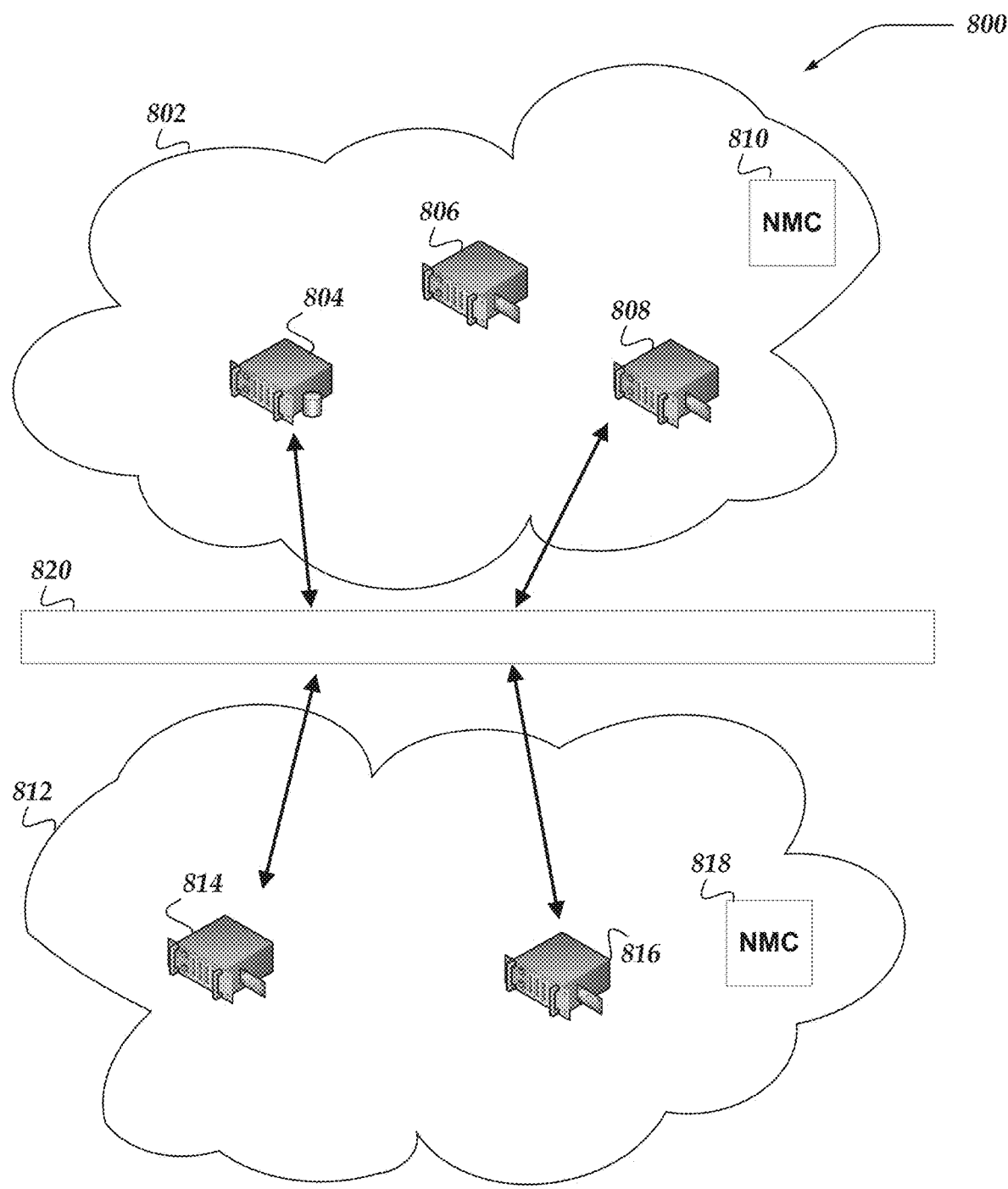
FIG. 8 illustrates a logical schematic of a system for correlating network traffic that crosses opaque endpoints in accordance with one or more of the various embodiments.

FIG. 8 illustrates a logical schematic of system 800 for correlating network traffic that crosses opaque endpoints in accordance with one or more of the various embodiments. In some embodiments, systems such as, system 800 may include two or more network segments, such as, network segment 802 or network segment 812 that may be in public cloud-based environments, private cloud-based computing environments, private on-premises data centers, or the like, or combination thereof. Also, in some embodiments, systems such as, system 800 may include one or more NAT layers, such as, NAT layer 820 that perform address translation, bridging, or the like, that enable entities in network segment 802 reach entities in network segment 812.

In one or more of the various embodiments, NAT layer 820, or the like, may generally be opaque such that a cloud provider may perform numerous address translations, routing, tunneling, or the like, that may not be visible to the users, owners, operators, administrators, or the like, of system 800. Thus, in one or more of the various embodiments, determining which entities in network segment 802 may be associated with the network traffic that reach entities in network segment 812 may be difficult.

Accordingly, in one or more of the various embodiments, NMCs, such as, NMC 810 or NMC 818 may be arranged to monitor the network traffic in network segment 802 and network segment 812 to collect metrics for some or all of the various flows in each network segment. In some embodiments, the collected metrics may be provided to a correlation engine to determine if one or more flows in network segment 802 may be correlated with network segment 812. In some embodiments, the correlation engine may enable users, administrators, or services to infer the source of network traffic see in one network segment even though that source may be in another network segment.

Figure 9A:
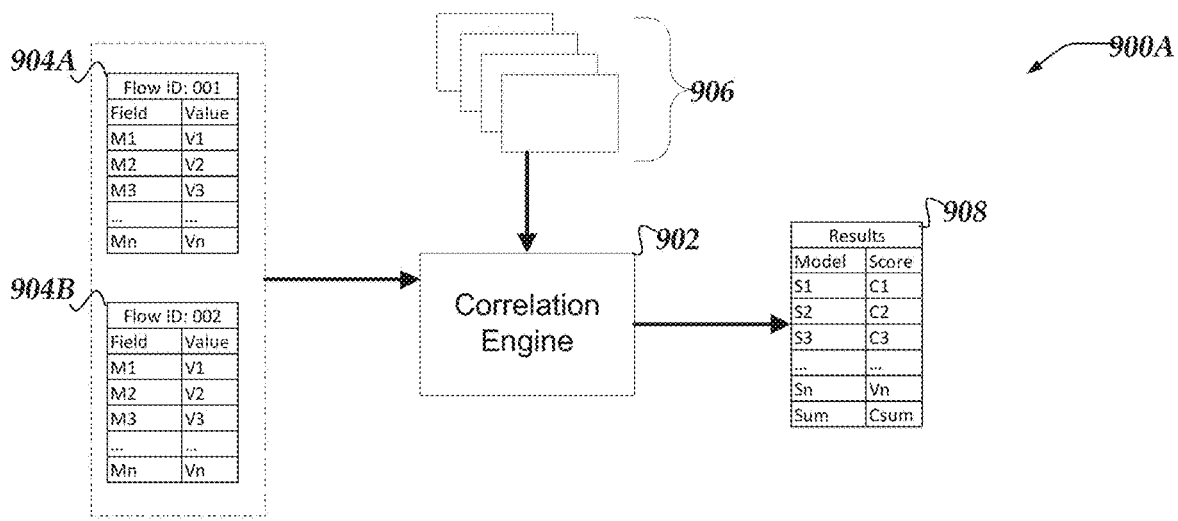
FIG. 9A illustrates a logical schematic of a portion of an NMC for using NMCs to correlate network traffic that crosses opaque endpoints in accordance with one or more of the various embodiments.

FIG. 9A illustrates a logical schematic of a portion of NMC 900A for using NMCs to correlate network traffic that crosses opaque endpoints in accordance with one or more of the various embodiments. In this example, NMC 900A may be considered to be a full featured NMC as described above. However, in the interest of brevity and clarity many of the components or part of NMC 900A are committed from FIG. 9A. Though, one or ordinary skill in the art will appreciate the portion of NMC 900A described here is at least sufficient for disclosing the innovations for correlating network traffic that crosses opaque endpoints.

In one or more of the various embodiments, NMCs may be arranged to include one or more correlation engines, such as, correlation engine 902. In some embodiments, correlation engines may be provided correlation information, such as, correlation information 904. In some embodiments, correlation information may include information based on or derived from monitoring network flows in two or more network segments. In this example, flow profile 904A and flow profile 904B may represent correlation information for flows in different network segments.

In one or more of the various embodiments, flow profiles, such as, flow profile 904A or flow profile 904B may be data structures that store one or more values that may be based on or derived from metrics collected by NMCs monitoring the network traffic in different network segments. In some embodiments, correlation information may be continuously provided to correlation engines as the information is produced. In other embodiments, NMCs may be arranged to periodically provide correlation information to correlation engines.

In one or more of the various embodiments, correlation engines, such as, correlation engine 902 may be arranged to employ one or more correlation models, such as correlation models 906 to determine if two or more flows may be correlated. In this example, correlation information 904 has flow profiles for two different flows. Accordingly, in this example, correlation engine 902 may generate a correlation profile, such as, correlation profile 908, that includes the correlation results produced by the one or more correlation models.

In one or more of the various embodiments, correlation profiles may be arranged to include correlation scores produced by each correlation model. In some embodiments, correlation scores from two or more correlation models may be weighted or summed together to produce a total correlation score. Thus, in some embodiments, the individual correlation scores may be considered correlation sub-scores, or the like. In some embodiments, correlation engines may be arranged to determine weights for individual correlation models based on configuration information. Also, in some embodiments, some correlation models may provide a confidence score that represents the likelihood that the correlation value is accurate. In some cases, the confidence score may be represented as margins of error, probability distributions, probabilities, variances, or the like.

In one or more of the various embodiments, correlation models are not limited to any particular theoretic method. Accordingly, in some embodiments, correlation models may include models that may be arranged to accept flow profiles or flow profile information as input parameters and provide flow correlation information as outputs. Further, in some embodiments, different correlation models may be arranged to receive more or fewer parameters than other correlation models. In one or more of the various embodiments, correlation models may be based on one or more heuristics, linear regressions, other linear models, machine learning models, or the like, or combination thereof.

In some embodiments, correlation scores (sub-scores) may be arranged to be expressed in various ranges having various intervals. Accordingly, in one or more of the various embodiments, correlation engines may be arranged to employ rules or instructions that may be provided via configuration information to normalize or otherwise adjust the values to a common scale, interval, or distribution.

In one or more of the various embodiments, flow profiles may include values associated with one or more metrics collected based on network traffic monitoring performed by one or more NMCs. In some embodiments, such metrics may include various information or values associated with state information, protocol status information, security/cryptography information, tuple information, transmission rates, latency measurements, or the like. For example, in one or more of the various embodiments, flow profiles may include information that represent various states or activities, including: connection status/behavior, such as opening, closing, resets, other connection information, or the like; session information/behavior; propagation of events/actions associated with connections, sessions, or applications; application protocol features, such as, cookies, handshakes, tokens, or the like; control flow vs data flow activity; security associations; Internet Control Message Protocol (ICMP) correlations, Transmission Control Protocol (TCP) flags/state; fast/slow startup; basic authorization activity; Kerberos tokens; Transport Layer Security (TLS) session tokens, x509 certificates; various temporal correlations, such as, latency, jitters, or the like.

In one or more of the various embodiments, generally, metrics or state collected by NMCs may be transformed or formatted into values that may be included in flow profiles. In some embodiments, such values may be continuous, discrete, categorical, numeric, alphanumeric, compound (more than one sub-part), or the like, or combination thereof. Also, in some embodiments, flow profiles may be arranged to include fields that one or more correlation models may ignore. Likewise, in some embodiments, one or more correlation models may require one or more fields that may not be included in every flow profile.

In one or more of the various embodiments, one or more correlation models may include defaults to provide values for field values not provided by a given flow profile. Alternatively, in one or more of the various embodiments, some correlation models may be included or excluded from determining flow correlations depending on the fields available in the flow profiles under consideration. In one or more of the various embodiments, correlation engines may be arranged to employ configuration information to determine rules for including or excluding correlation models from determining flow correlations.

In one or more of the various embodiments, flow profiles may be updated on the fly as more relevant information may be collected by NMCs. Also, in one or more of the various embodiments, correlation profiles may be progressively generated as new or updated correlation information or flow profiles are provided.

Figure 9B:
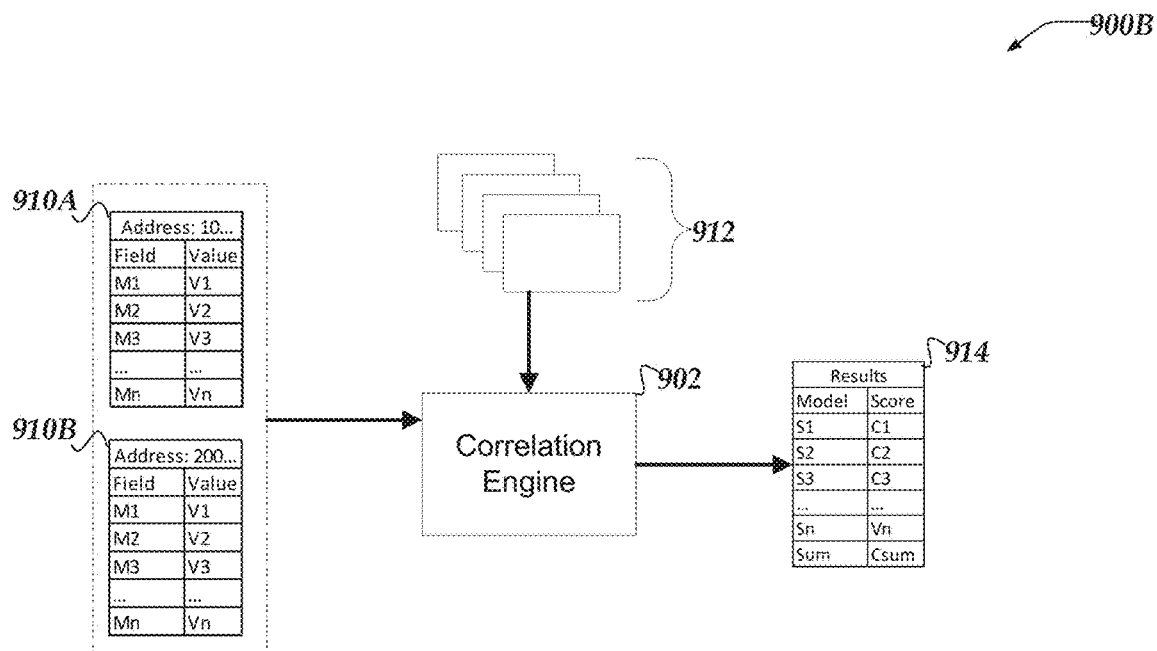
FIG. 9B illustrates a logical schematic of a portion of an NMC for using NMCs to correlate network traffic that associated with network addresses in accordance with one or more of the various embodiments.

FIG. 9B illustrates a logical schematic of a portion of NMC 900B for using NMCs to correlate network traffic associated with network addresses in accordance with one or more of the various embodiments. In this example, NMC 900B may be considered to be a full featured NMC as described above. However, in the interest of brevity and clarity many of the components or part of NMC 900B are committed from FIG. 9B. Further, NMC 900B may be considered similar to NMC 900A described above. Accordingly, for brevity and clarity some redundant descriptions are omitted. Though, one or ordinary skill in the art will appreciate the portion of NMC 900B described here is at least sufficient for disclosing the innovations for correlating network traffic that crosses opaque endpoints.

In one or more of the various embodiments, address profiles, such as, address profile 910A or flow profile 910B may be data structures that store one or more values that may be based on or derived from metrics collected by NMCs monitoring the network traffic associated with different network addresses. In some embodiments, correlation information may be continuously provided to correlation engines as the information is produced. In other embodiments, NMCs may be arranged to periodically provide correlation information to correlation engines. Accordingly, in some embodiments, similar to collecting metrics for individual network flows in flow profiles, NMCs may be arranged to collect metrics associated with network addresses in address profiles that aggregate metrics associated with the network addresses. Thus, in some embodiments, correlation models, such as, correlation models 912 may be to correlate address profiles to provide correlation profiles, such as, correlation profiles 914 that described one or more characteristics of correlations that may be inferred or discovered for one or more network address.

In some embodiments, one or more address profiles may be associated with network addresses associated with VPN gateways. For example, one or more address profiles may be associated external VPN network addresses that provide encrypted VPN tunnels to external endpoints. Likewise, for example, one or more address profiles may be associated with internal network addresses that a VPN gateway has mapped to external VPN addresses.

Accordingly, in some embodiments, correlation engines may be arranged to evaluate address profiles associated with an external VPN network addresses and an internal VPN address to infer of they correspond to each other. Note, this type of determination may be otherwise difficult or impossible because the connection between VPN gateways and external endpoints may be encrypted or otherwise obscured such that the correlation between external VPN network addresses and internal VPN network addresses cannot be directly observed. However, in some embodiments, correlation engines may be arranged to employ one or more observable metrics associated with network addresses to infer if an external VPN network address may be associated with an internal VPN network address.

For example, in some embodiments, NMCs may be arranged to generate one or more metrics based on monitoring the amount of network traffic sent or received from external VPN network address or the amount of network traffic sent or received from internal VPN network addresses. Thus, in this example, if over similar time periods the metrics values are similar, the NMC infer that the two VPN network addresses correspond to each other. Note, as described, the rules, parameters, metrics, threshold values, or the like, for determining correlations or inferences may be encapsulated in correlation models.

Generalized Operations

FIGS. 10-18 represent generalized operations for correlating network traffic that crosses opaque endpoints in accordance with one or more of the various embodiments. In one or more of the various embodiments, processes 1000, 1100, 1200, 1300, 1400, 1500, 1600, 1700, and 1800 described in conjunction with FIGS. 10-18 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 10-18 may be used for correlating network traffic that crosses opaque endpoints in accordance with at least one of the various embodiments or architectures such as those described in conjunction with FIGS. 4-9. Further, in one or more of the various embodiments, some or all of the actions performed by processes 1000, 1100, 1200, 1300, 1400, 1500, 1600, 1700, and 1800 may be executed in part by network monitoring engine 322, correlation engine 324, modeling engine 326, or the like, running on one or more processors of one or more network computers.

Figure 10:
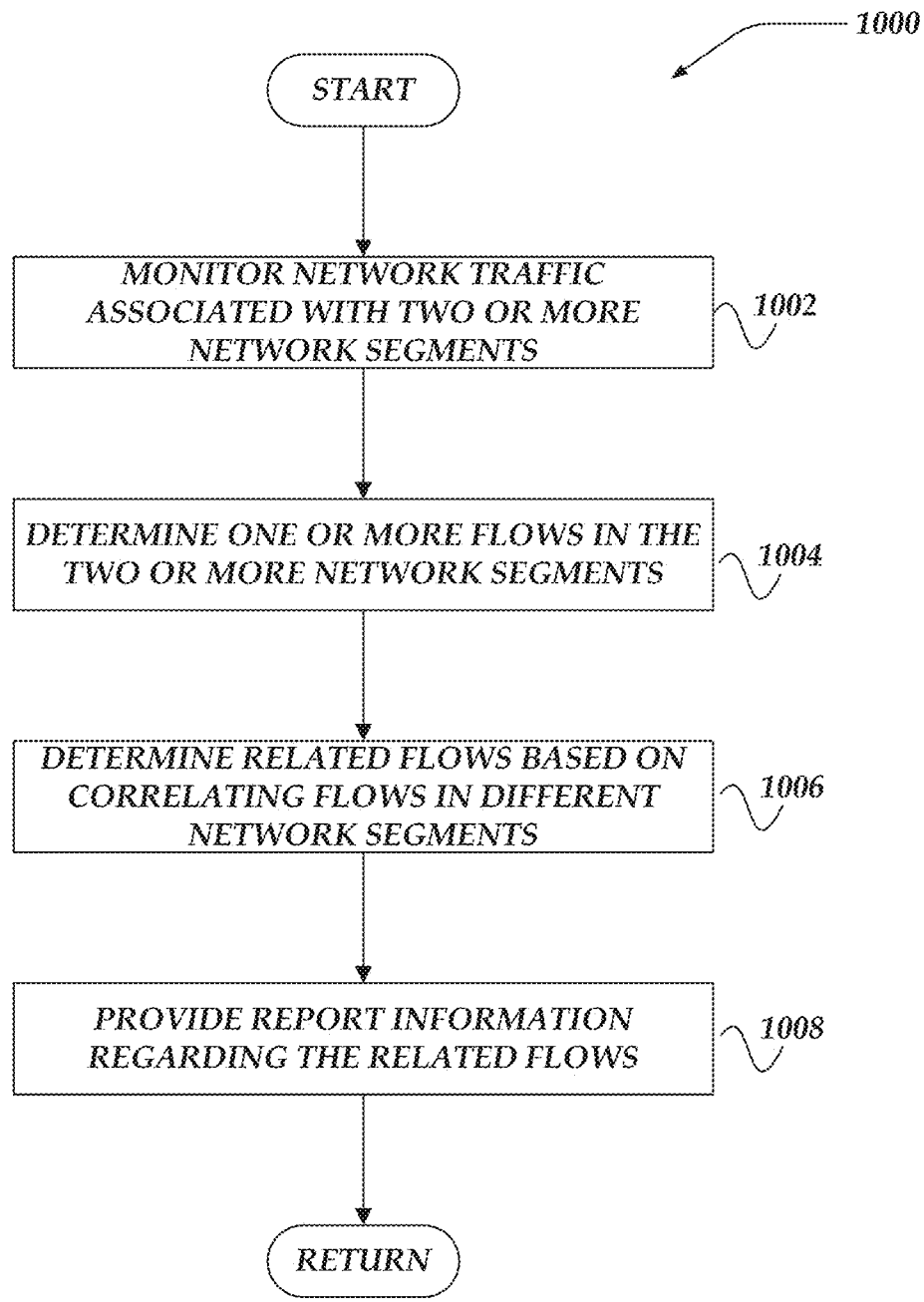
FIG. 10 illustrates an overview flowchart of a process for correlating network traffic that crosses opaque endpoints in accordance with one or more of the various embodiments.

FIG. 10 illustrates an overview flowchart of process 1000 for correlating network traffic that crosses opaque endpoints in accordance with one or more of the various embodiments. After a start block, at block 1002, in one or more of the various embodiments, NMCs may be arranged to monitor network traffic that may be associated with two or more network segments.

At block 1004, in one or more of the various embodiments, the NMCs may be arranged to determine one or more flows in the two or more network segments. In one or more of the various embodiments, monitored network traffic may be associated with network flows. In some embodiments, NMCs may be arranged to determine flows from among the monitored network traffic based on various characteristics of the network traffic. For example, in some embodiments, network flows may be determined based on a combination of tuple information, protocol information, or the like. In some embodiments, NMCs may be arranged to obtain the particular criteria for determining flows within monitored network traffic via configuration information.

At block 1006, in one or more of the various embodiments, the NMCs may be arranged to determine one or more correlated flows in the network segments. As described above, correlation engines may be employed to correlate network flows that may be in different network segments. In some embodiments, network monitoring engines may be arranged to generate flow profiles for determined flows based on the characteristics of the network traffic that may be associated with a given flow. Accordingly, in some embodiments, the flow profiles may be provided to correlation engines. In some embodiments, the correlation engines may be arranged to employ the flow profiles and one or more correlation models to generate correlation profiles that may indicate the amount of correlation among two or more flows.

At block 1008, in one or more of the various embodiments, the NMCs may be arranged to provide report information regarding the one or more correlated flows. In one or more of the various embodiments, NMCs may be arranged to provide correlation reports for a variety of uses. In some embodiments, NMCs may be configured to provide different report information depending on the type of flows, level of correlation between flows, or the like. For example, in some embodiments, some correlations may trigger an NMC to generate log records while other correlations may trigger the NMC to raise an alarm. In one or more of the various embodiments, NMCs may be arranged to determine the criteria for generating reporting information or what kind of report information to provide based on rules or instructions provided via configuration information.

Next, in one or more of the various embodiments, control may be returned to a calling process.

Figure 11:
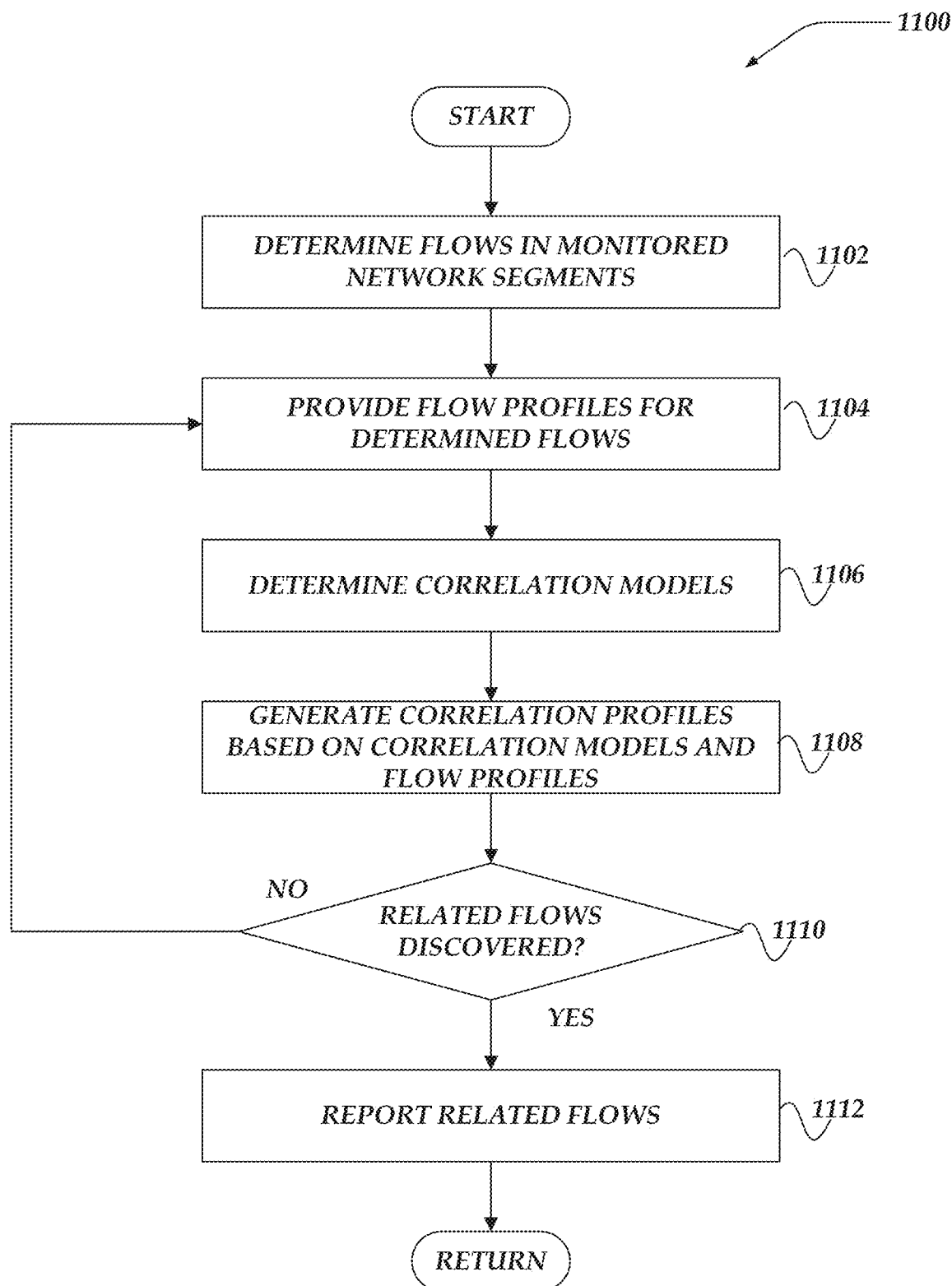
FIG. 11 illustrates a flowchart of a process for correlating network traffic that crosses opaque endpoints in accordance with one or more of the various embodiments.

FIG. 11 illustrates a flowchart of process 1100 for correlating network traffic that crosses opaque endpoints in accordance with one or more of the various embodiments. After a start block, at block 1102, in one or more of the various embodiments, the NMCs may be arranged to determine one or more flows in one or more monitored network segments. As described above, monitoring network traffic is a core function of NMCs or other services. In some embodiments, some or all of the relevant network monitoring, network activity information, or activity/performance metrics may be provided by another service that may be separate from NMCs.

In one or more of the various embodiments, one or more NMCs may be arranged to monitor network traffic in more than one network segment. In some embodiments, a single NMC may be arranged to monitor network traffic occurring in two or more network segments. Likewise, in some embodiments, one or more NMCs may be arranged to monitor network traffic in separate network segments. In some embodiments, NMCs may be arranged to share monitoring information, configuration information, collected metrics, correlation models, flow profiles, correlation profiles, or the like.

At block 1104, in one or more of the various embodiments, the NMCs may be arranged to provide flow profiles that may be associated with the one or more flows. In one or more of the various embodiments, one or more NMCs may be arranged to generate flow profiles for the monitored flows. In some embodiments, flow profiles may be associated with flows based on tuple information, or the like. In some embodiments, flow profiles may be maintained or updated for the life of a flow. In some embodiments, NMCs may be arranged to determine some or all of the metrics or fields to include in flow profiles based on rules, or the like, provided via configuration information.

At block 1106, in one or more of the various embodiments, correlation engines may be arranged to determine one or more correlation models to employ for correlating the one or more flows. As described above, correlation models may be comprised of data structures, rules, instructions, or the like, that enable correlation models to provide correlation scores, confidence scores, or the like, that may be included in correlation profiles.

In one or more of the various embodiments, one or more correlation models may have restrictions based on input requirements, network configuration, traffic characteristics, or the like. Further, in one or more of the various embodiments, some correlation models may be arranged for correlation specific types of flows. For example, in some embodiments, some correlation models may be arranged for correlating encrypted flows while others may be arranged for correlating un-encrypted flows. Likewise, for example, some correlation models may be arranged for correlating transaction based flows rather than streaming flows, or the like.

Accordingly, in one or more of the various embodiments, correlation engines may be arranged to determine the relevant or qualified correlation models based on one or more of the characteristics of the flows, characteristics of the models, or the like. In some embodiments, correlation engines may be arranged to employ rules provided via configuration information for determine which correlation models to employ.

At block 1108, in one or more of the various embodiments, the correlation engines may be arranged to generate one or more correlation profiles based on the one or more correlation models or the one or more flow profiles. In one or more of the various embodiments, correlation engines may be arranged to employ the one or more determine correlation models to produce correlation profiles for the flows under consideration. As described above, correlation profiles may be comprised of one or more sub-parts that may be evaluated to contribute to a total correlation score. In some embodiments, correlation engines may be arranged to represent scores as discrete values or probability distributions.

Also, in one or more of the various embodiments, two or more correlation models may be employed to provide the correlation profiles. In some embodiments, each correlation model may contribute one or more values or parts to correlation profiles. In some embodiments, correlation engines may be arranged to weight the contribution of different correlation models based on various factors, including user feedback, training feedback, rules provided via configuration information, or the like.

At decision block 1110, in one or more of the various embodiments, if correlated flows may be discovered, control may flow to block 1112; otherwise, control may loop back block 1104. In one or more of the various embodiments, rules provided via configuration information may be employed to determine if a given correlation score should be considered relevant. In some embodiments, some of the scores included in a correlation profile may be discarded. For example, a correlation engines may be arranged to discard a highest score and a lower score to reduce outlier results skewing the overall correlation score.

At block 1112, in one or more of the various embodiments, the NMCs may be arranged to generate report information that may be associated with the correlation results. In some embodiments, NMCs may be arranged to generate report information that may include logs, notifications, or the like, that indicate if two or more flows may be correlated. In some embodiments, the particular type of report information as well as its format or destination may be determined using configuration information. For example, in some embodiments, configuration information may include a list of templates for providing log records associated with flow correlation.

Next, in one or more of the various embodiments, control may be returned to a calling process.

Figure 12:
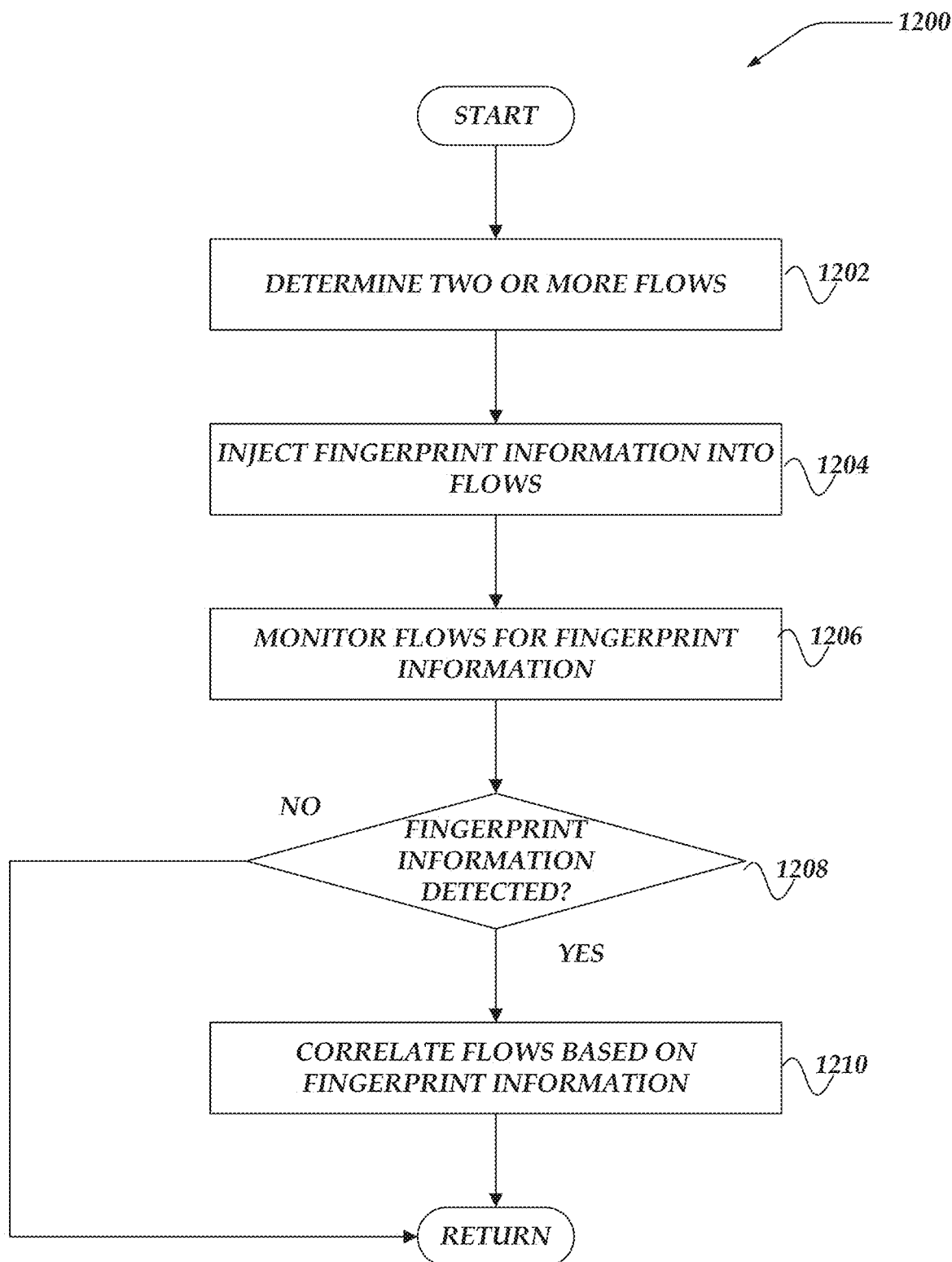
FIG. 12 illustrates a flowchart of a process for correlating flows based on injected fingerprint information in accordance with one or more of the various embodiments.

FIG. 12 illustrates a flowchart of process 1200 for correlating flows based on injected fingerprint information in accordance with one or more of the various embodiments. After a start block, at block 1202, in one or more of the various embodiments, NMCs may be arranged to determine two or more flows in the monitored network segments.

At block 1204, in one or more of the various embodiments, the NMCs may be arranged to inject fingerprint information into the two or more flows. In some embodiments fingerprint information may include known information, such as, keys, GUIDs, tokens, padding, non-operative (no-op) values included in fields or packets, or the like, or combination thereof. In some embodiments, the particular fingerprint information may depend on the communication protocol or application protocol associated with a given flow.

Accordingly, in some embodiments, NMCs may be arranged to determine the application or communication protocol of flows before injecting fingerprint information into a flow. In some embodiments, NMCs may be arranged to employ rules, instructions, filters, or the like, provided via configuration information to determine the particular fingerprint information to include in a flow. For example, in one or more of the various embodiments, configuration information may include rules defining the fingerprint information that may be automatically included in flow associated with a given application protocol.

In some embodiments, NMCs may be arranged to include one or more indicators in the flow profiles of flows that include the fingerprint information.

At block 1206, in one or more of the various embodiments, the NMCs may be arranged to monitor the two or more flows for the fingerprint information. In one or more of the various embodiments, flows may be monitored to determine if they include fingerprint information. In some embodiments, flows in one network segment may be injected with fingerprint information. As the flows pass through one or more edge or bridge devices, the source of the flows may be obscured. However, in some embodiments, some or all of the fingerprint information may be passed through the obscuring devices an included in flows in other network segments. Accordingly, in one or more of the various embodiments, NMCs may be arranged to monitor flows in one network segment to detect if they include fingerprint information that was added flows in other network segments.

Accordingly, in one or more of the various embodiments, NMCs may be arranged to apply various rules, patterns, filters, or the like, to detect fingerprint information that is known to have been included in flows from another network segment. In one or more of the various embodiments, the particular rules, patterns, filters, or the like, used for detecting fingerprint information may be provided via configuration information.

At decision block 1208, in one or more of the various embodiments, if the fingerprint information may be detected, control may flow to block 1210; otherwise, control may be returned to a calling process.

Accordingly, in one or more of the various embodiments, NMCs (or monitoring engines) may be arranged to include one or more values that may be associated with the likelihood that one or more flows may include injected fingerprint information. In some embodiments, such values may be represented as discrete scores, probability scores, probability distributions, or the like.

At block 1210, in one or more of the various embodiments, correlation engines may be arranged to correlate the two or more flows based on the fingerprint information. As described, above correlation engines may be arranged to employ one or more correlation models to provide correlation profiles for flows. In some embodiments, one or more correlation models may be arranged to evaluate finger information that may be included in flow profiles or otherwise associated with one or more flows of interest. For example, in some embodiments, one or more correlation models may include input parameters that may be associated with finger information included in the flow profiles.

Next, in one or more of the various embodiments, control may be returned to a calling process.

Figure 13:
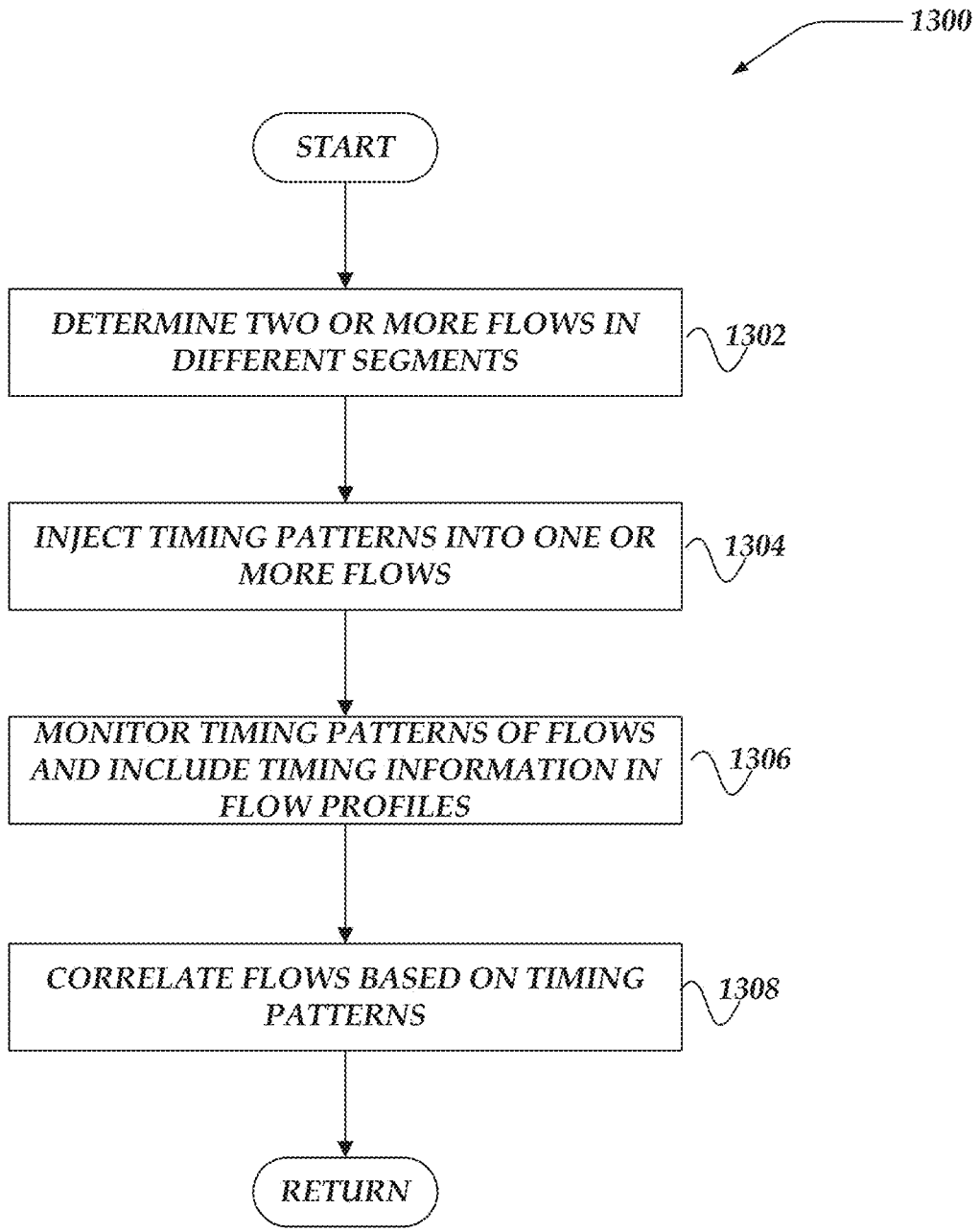
FIG. 13 illustrates a flowchart of a process for correlating flows based on injected timing patterns in accordance with one or more of the various embodiments.

FIG. 13 illustrates a flowchart of process 1300 for correlating flows based on injected timing patterns in accordance with one or more of the various embodiments. After a start block, at block 1302, in one or more of the various embodiments, NMCs may be arranged to determine two or more flows in the monitored network segments.

At block 1304, in one or more of the various embodiments, the NMCs may be arranged to inject timing patterns into the two or more flows. In one or more of the various embodiments, NMCs may be configured to determine the one or more endpoints that may be associated with the two or more flows.

In one or more of the various embodiments, the one or more NMCs may be arranged to modify one or more characteristics of the network traffic associated with the two or more flows to introduce latency or delays that may alter the behavior or of the two or more flows.

In some embodiments, some or all the modifications may be arranged such that the endpoints (e.g., clients or servers) are unaware of the modifications. Also, in one or more of the various embodiments, NMCs may be arranged to modify the network characteristics such that the selected flows may be impacted while the remainder of the flows may be unaffected.

Also, in one or more of the various embodiments, NMCs may be arranged to execute instructions to modify the network paths between the selected endpoints. in one or more of the various embodiments, NMCs may be arranged to issue commands to routers or routing services to generate temporary routing paths through the network that may introduce timing delays. In some embodiments, NMCs may be arranged to re-write network packets that may be associated with selected endpoints to change their routes though the network. Also, in some embodiments, NMCs may be arranged to modify the network traffic of selected endpoints to direct them to buffers that may capture and hold the traffic to introduce delay.

In one or more of the various embodiments, NMCs may be arranged to modify the flow profiles of one or more flows to include information associated with the timing changes. For example, in some embodiments, if latency is being introduced to a flows, information related to the introduced latency may be included in the flow profile.

At block 1306, in one or more of the various embodiments, the NMCs may be arranged to monitor the two or more flows for the timing patterns to include timing information in the flow profiles. In one or more of the various embodiments, NMCs may be arranged to watch for patterns in the network traffic associated with various flows that may correspond to the introduced timing patterns.

Accordingly, in one or more of the various embodiments, NMCs (or monitoring engines) may be arranged to include a value that is associated with the likelihood that one or more flows may have timing characteristics that may be associated with injected timing patterns. In some embodiments, such values may be represented as discrete scores, probability score, probability distributions, or the like.

At block 1308, in one or more of the various embodiments, correlation engines may be arranged to correlate the two or more flows based on the timing information included in the flow profiles. As described, above correlation engines may be arranged to employ one or more correlation models to provide correlation profiles for flows. In some embodiments, one or more correlation models may be arranged to compare timing information that may be included in a flow profile or otherwise associated with one or more flows of interest. For example, in some embodiments, one or more correlation models may include input parameters that may be associated timing information included in the flow profiles.

Next, in one or more of the various embodiments, control may be returned to a calling process.

Figure 14:
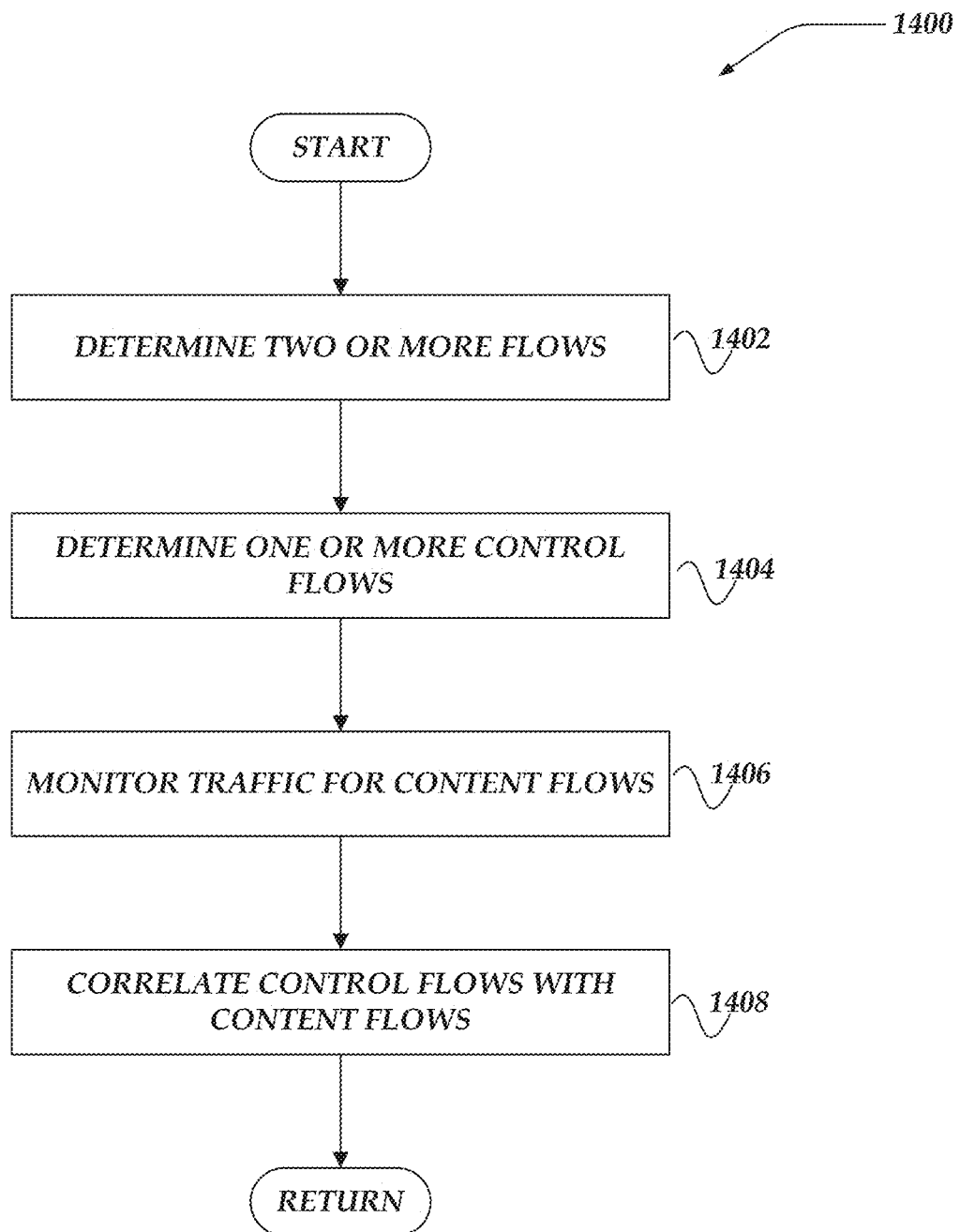
FIG. 14 illustrates a flowchart of a process for correlating control flows with related content flows in accordance with one or more of the various embodiments.

FIG. 14 illustrates a flowchart of process 1400 for correlating control flows with related content flows in accordance with one or more of the various embodiments. After a start block, at block 1402, in one or more of the various embodiments, NMCs may be arranged to determine two or more flows in the monitored network segments. See, above for more details.

At block 1404, in one or more of the various embodiments, the NMCs may be arranged to determine one or more control flows. In one or more of the various embodiments, NMCs may be arranged to distinguish control flows from other kinds of flows. In some embodiments, control flows may be network flows that are associated with a multi-flow application that uses one or more flows for communicating control information and one or more other flows for communication content information.

In one or more of the various embodiments, often control flows may be used for setting up or configuring the content flows. Accordingly, in one or more of the various embodiments, there may be behavior patterns as well as protocol/application specific characteristics that may lend themselves distinguishing between control flows or other flows. Also, in some embodiments, control flows for different applications or application protocols may have distinct characteristics such that control flows for one application may be determined based on different criteria than other applications. In some embodiments, the control flow may establish sessions, relay commands between clients and servers, share configuration settings between clients or servers, or the like.

In some embodiments, NMCs may be arranged to employ patterns, templates, filters, metrics, or the like, that may be defined via configuration information for determining if a network flow may be a control flow.

Accordingly, in one or more of the various embodiments, NMCs (or monitoring engines) may be arranged to include a value that is associated with the likelihood that one or more flows may be content flows. In some embodiments, such values may be represented as discrete scores, probability score, probability distributions, or the like.

At block 1406, in one or more of the various embodiments, the NMCs may be arranged to monitor network traffic for content flows. In one or more of the various embodiments, content flows may be flows dedicated to carrying content while one or more control flows manage or perform one or more control activities. In some embodiments, content flows may include streaming media, data streams, voice channels (for VOIP), or the like.

In some embodiments, NMCs may be arranged to employ patterns, templates, filters, metrics, or the like, that may be defined via configuration information for determining if a network flow may be a content flow.

Accordingly, in one or more of the various embodiments, NMCs (or monitoring engines) may be arranged to include a value that is associated with the likelihood that one or more flows may be content flows. In some embodiments, such values may be represented as discrete scores, probability scores, probability distributions, or the like.

At block 1408, in one or more of the various embodiments, correlation engines may be arranged to correlate the control flows with related stream flows. In one or more of the various embodiments, correlation engines may be arranged to employ one or more correlation models to determine correlation profiles for various flows that may be determined in monitored networks. As described above, correlation models may be arranged to apply various heuristics, Machine Learning models, rules, or the like, to generate correlation profiles based on one or more flow profiles. In some embodiments, one or more correlation models may be arranged to consider if two or more flows may be correlated based on whether they may be related control flows or content flows.

Next, in one or more of the various embodiments, control may be returned to a calling process.

Figure 15:
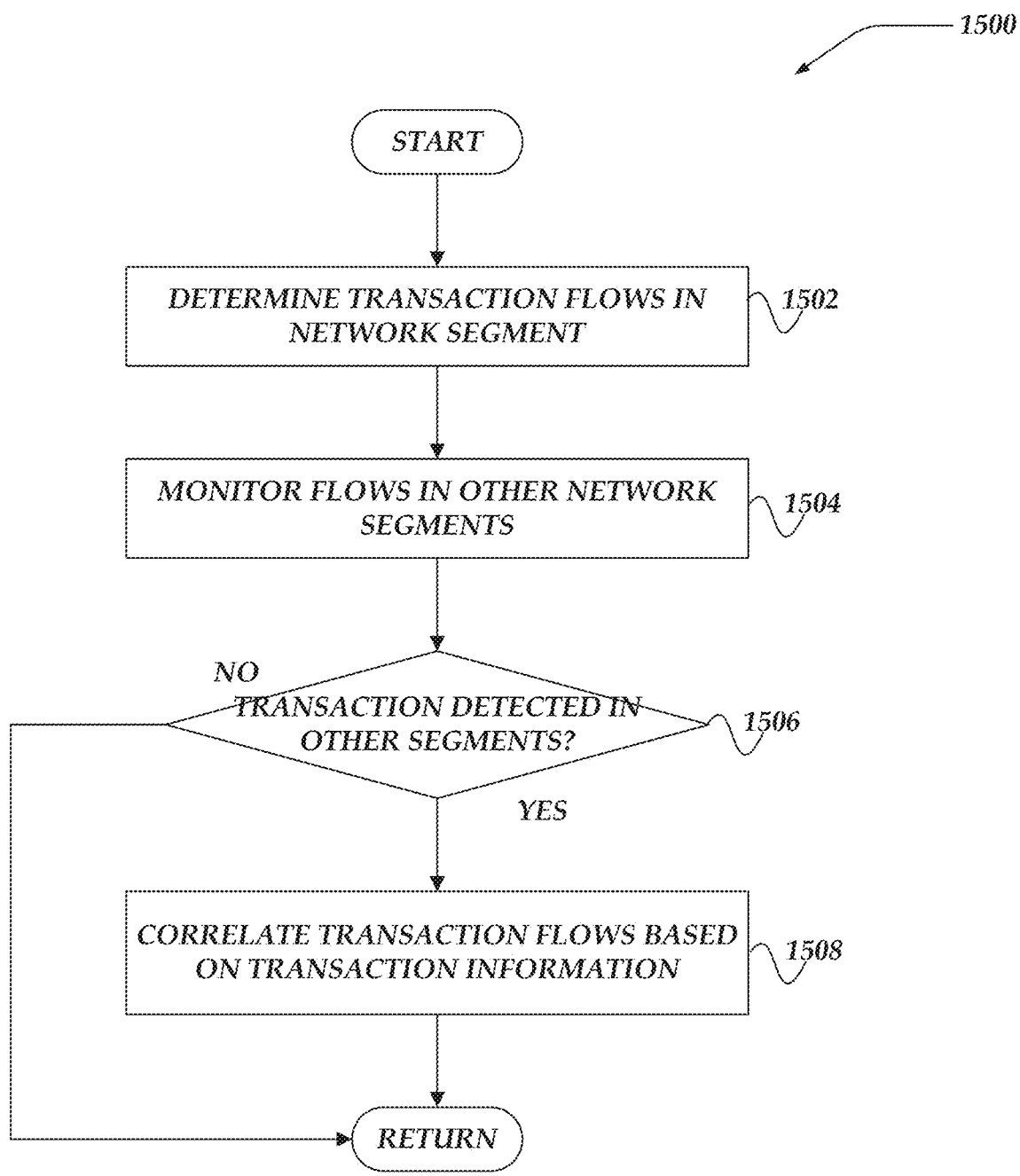
FIG. 15 illustrates a flowchart of a process for correlating control flows with based on transaction information in accordance with one or more of the various embodiments.

FIG. 15 illustrates a flowchart of process 1500 for correlating control flows with based on transaction information in accordance with one or more of the various embodiments. After a start block, at block 1502, in one or more of the various embodiments, NMCs may be arranged to determine one or more transaction flows in the monitored network segments. In one or more of the various embodiments, transaction flows may be flows associated with one or more known or discovered transactions. As described above, in some embodiments, NMCs may be arranged include rules, patterns, filters, or the like, to identify flows that may be associated with one or more known applications. Accordingly, in some embodiments, NMCs may be arranged to include state machines, or the like, that enables NMCs to predict requests or responses that may be likely to occur. In some embodiments, NMCs may be configured to expect requests or responses for particular applications to have known characteristics. Accordingly, in one or more of the various embodiments, NMCs may monitor transaction characteristics of flows in one network segment and compare them to transaction characteristics of other flows in other network segments.

In one or more of the various embodiments, NMCs may be arranged to update flow profiles for one or more flows with information related to transactions. In some embodiments, the application protocol associated with a flow may infer one or more transaction characteristics based on the nature of the application.

In one or more of the various embodiments, specific transactions may be observable to NMCs. In some embodiments, NMCs may determine one or more features of a given transaction that may be observable across network segments. For example, in some embodiments, some applications may be known to include sequence numbers, tokens, credential information, or the like, that may be tracked across network segments.

Also, in one or more of the various embodiments, in cases where the content or payload of the transactions are unavailable, NMCs may be arranged to recognize traffic patterns that may be associated with transactions of various applications. For example, in some embodiments, clients communicating with databases often send query requests that may be relatively light weight such that they fit into one or two packets of network traffic. However, for example, the corresponding databases servers may send responses that may be comprised of many packets or network traffic.

At block 1504, in one or more of the various embodiments, the NMCs may be arranged to monitor one or more flows in other network segments. In one or more of the various embodiments, NMCs may be arranged to follow network traffic associated with transactions as they cross from one network segment to another network segment.

At decision block 1506, in one or more of the various embodiments, if the one or more transactions may be detected in other network segments; control may flow block 1508; other control may be returned to a calling process.

In some embodiments, in cases where the transaction information can be observed directly, NMCs may be arranged to determine the flows in different network segments that include the same transaction information.

In other cases, if the transaction information is obscured (e.g., encrypted), NMCs may be arranged to rely on network traffic shape information to predict if a flows may be associated with the same transaction.

At block 1508, in one or more of the various embodiments, correlation engines may be arranged to correlate the one or more transaction flows based on information associated with the detected transactions.

In one or more of the various embodiments, correlation engines may be arranged to employ one or more correlation models to determine correlation profiles for various flows that may be determined in monitored networks. As described above, correlation models may be arranged to apply various heuristics, machine learning models, rules, or the like, to generate correlation profiles based on one or more flow profiles. In some embodiments, one or more correlation models may be arranged to consider if two or more flows may be correlated based on whether the transaction characteristics, if any, that may be associated with flows.

Next, in one or more of the various embodiments, control may be returned to a calling process.

Figure 16:
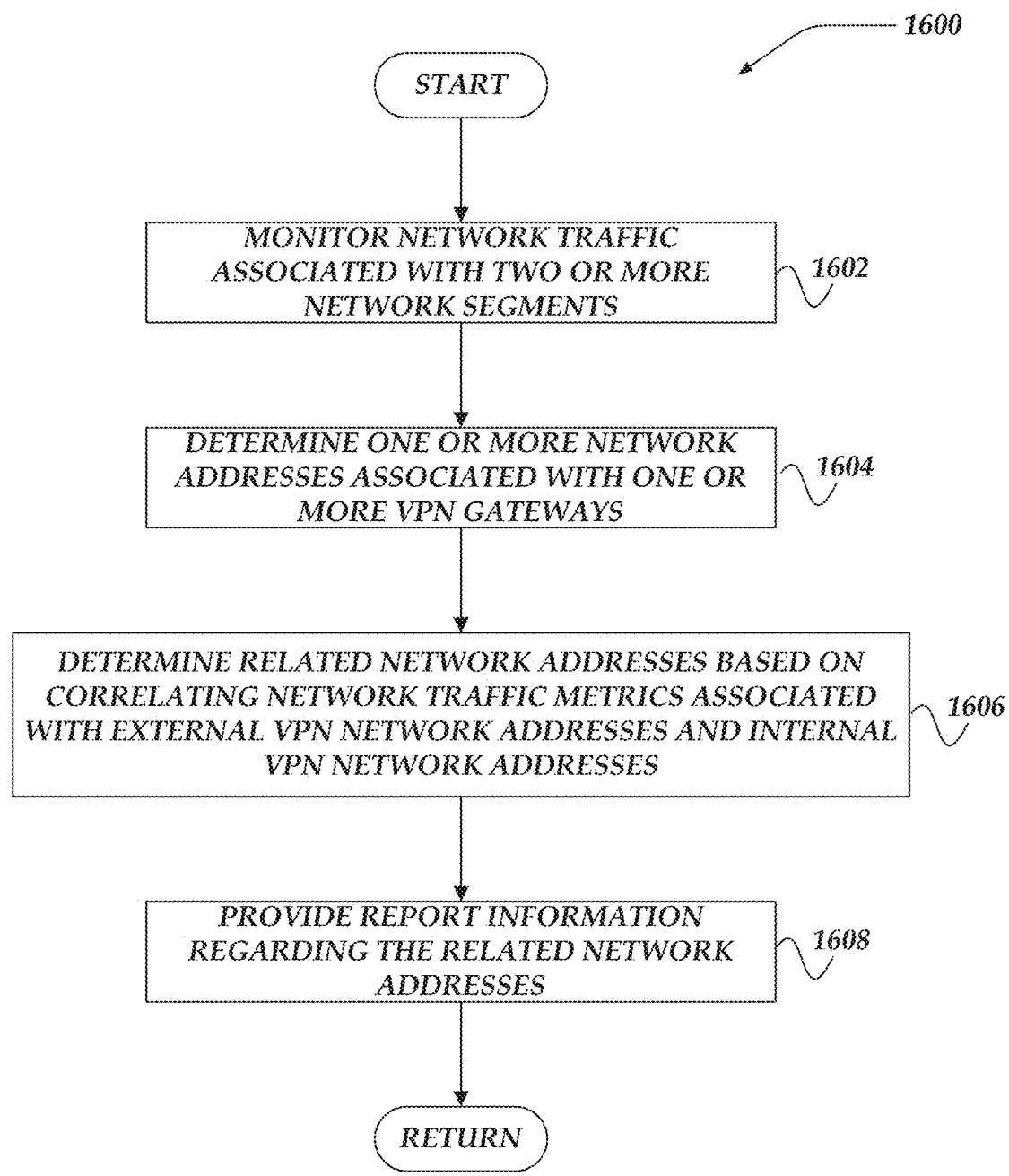
FIG. 16 illustrates an overview flowchart of a process for correlating network traffic that crosses opaque endpoints associated with VPN gateways in accordance with one or more of the various embodiments.

FIG. 16 illustrates an overview flowchart of process 1600 for correlating network traffic that crosses opaque endpoints associated with VPN gateways in accordance with one or more of the various embodiments. After a start block, at block 1602, in one or more of the various embodiments, NMCs may be arranged to monitor network traffic that may be associated with two or more network segments. Accordingly, in some embodiments, NMCs may be arranged to monitor network traffic within the monitored network segments including network traffic that may be considered external network traffic based on it being provided by endpoints/network addresses that may be considered outside of a protected network or communicated to network addresses outside the protected network.

At block 1604, in one or more of the various embodiments, the NMCs may be arranged to determine one or more network addresses in the two or more network segments that may be associated with one or more VPN gateways. In some embodiments, NMCs may be arranged to determine network address that may be associated with VPNs based on one or more characteristics of the monitored network traffic. For example, in some embodiments, network addresses may be determined based on a combination of tuple information, protocol information, routing information, or the like. In some embodiments, NMCs may be arranged to obtain the particular criteria for determining network addresses that may be associated with VPN gateways based on via configuration information.

At block 1606, in one or more of the various embodiments, the NMCs may be arranged to determine one or more related/correlated network address in the network segments. As described above, correlation engines may be employed to correlate network addresses that may be in different network segments, including correlating external VPN network addresses with internal VPN network addresses. In some embodiments, network monitoring engines may be arranged to generate address profiles for determined network addresses based on the characteristics of the network traffic that may be associated with a given network address. Accordingly, in some embodiments, the address profiles may be provided to correlation engines. In some embodiments, the correlation engines may be arranged to employ the address profiles and one or more correlation models to generate correlation profiles that may indicate the amount of correlation among two or more network addresses.

At block 1608, in one or more of the various embodiments, the NMCs may be arranged to provide report information regarding the one or more correlated network addresses. In one or more of the various embodiments, NMCs may be arranged to provide correlation reports for a variety of uses. In some embodiments, NMCs may be configured to provide different report information depending on the type of network addresses, level of correlation between network addresses, or the like. For example, in some embodiments, some correlations may trigger an NMC to generate log records while other correlations may trigger the NMC to raise an alarm. In one or more of the various embodiments, NMCs may be arranged to determine the criteria for generating reporting information or what kind of report information to provide based on rules or instructions provided via configuration information.

Next, in one or more of the various embodiments, control may be returned to a calling process.

Figure 17:
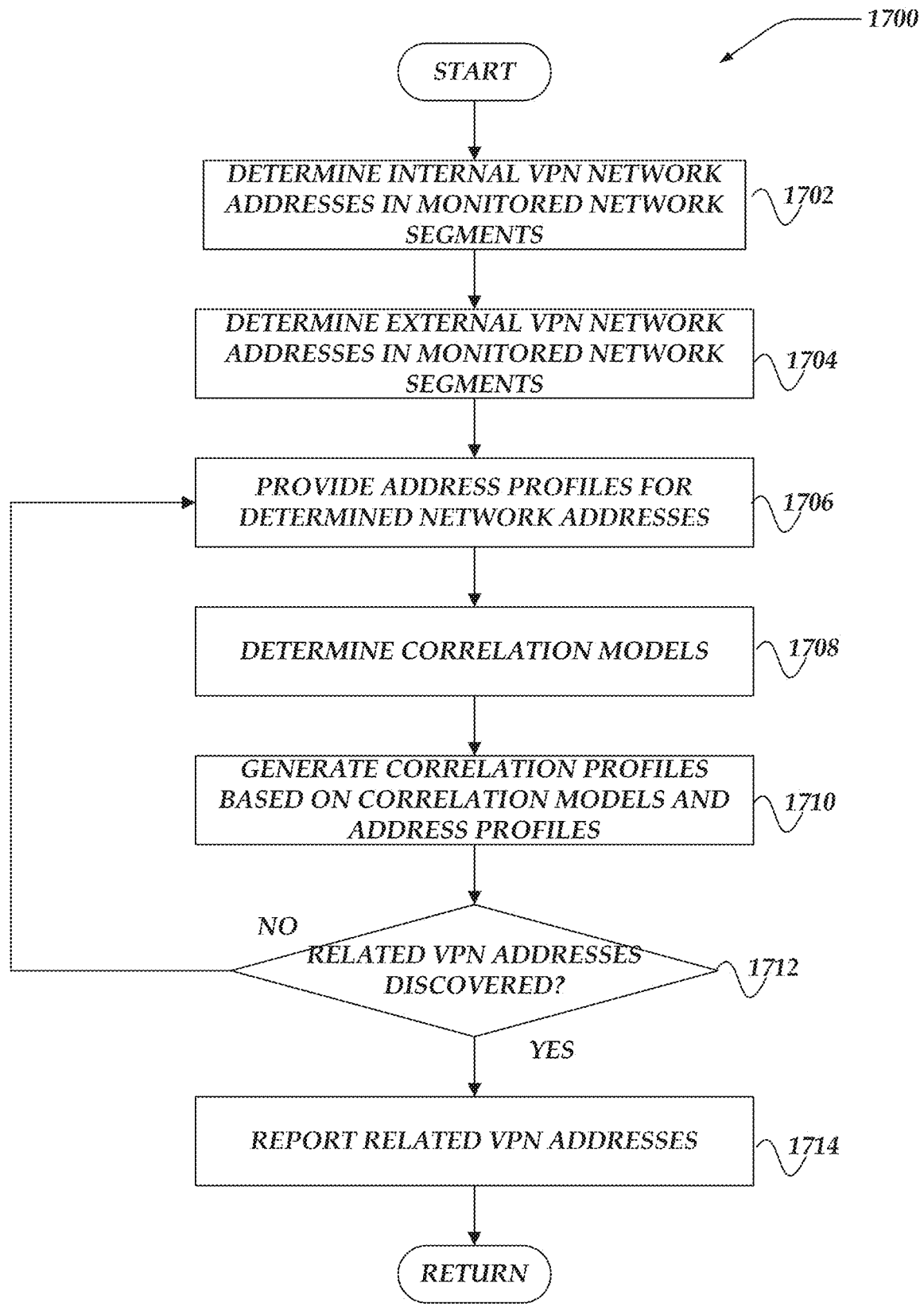
FIG. 17 illustrates a flowchart of a process for correlating network addresses associated VPN gateways in accordance with one or more of the various embodiments.

FIG. 17 illustrates a flowchart of process 1700 for correlating network addresses associated VPN gateways in accordance with one or more of the various embodiments. After a start block, at block 1702, in one or more of the various embodiments, the NMCs may be arranged to determine one or more internal VPN network addresses associated with one or more VPN gateways in one or more monitored network segments. As described above, monitoring network traffic is a core function of NMCs or other services. In some embodiments, some or all of the relevant network monitoring, network activity information, or activity/performance metrics may be provided by another service that may be separate from NMCs. Accordingly, in one or more of the various embodiments, NMCs may be arranged to determine one or more internal VPN network addresses that VPN gateways may be employing to communicate network traffic to or from one or more computers, services, or devices in the monitored networks. In some embodiments, NMCs may be configured to identify internal VPN network addresses based on provided information (e.g., address lists, address ranges/masks, or the like). Also, in some embodiments, NMCs may be arranged to determine internal VPN network addresses based on monitoring tuple information associated with network traffic that may be associated with VPN gateways. For example, in some embodiments, monitored networks may be configured (e.g., routing tables, or the like) to selectively route network traffic to VPN gateways. Accordingly, for example, in some embodiments, if NMCs observe internal network traffic being routed to VPN gateways or provided from VPN gateways, NMCs may determine that the associated internal network addresses may be internal VPN network addresses.

At block 1704, in one or more of the various embodiments, the NMCs may be arranged to determine one or more external VPN network addresses associated with one or more VPN gateways in one or more monitored network segments. As described above, monitoring network traffic is a core function of NMCs or other services. In some embodiments, some or all of the relevant network monitoring, network activity information, or activity/performance metrics may be provided by another service that may be separate from NMCs. Accordingly, in one or more of the various embodiments, NMCs may be arranged to determine one or more external VPN network addresses that VPN gateways may be employing to communicate network traffic to or from one or more external computers, services, or devices (e.g., VPN clients) that may be external to the monitored networks. In some embodiments, NMCs may be configured to identify external VPN network addresses based on provided information (e.g., address lists, address ranges/masks, or the like). In some embodiments, the NMCs may be arranged to initially determine some or all external network addresses that are associated with encrypted or opaque network traffic as potential external VPN gateways. For example, in some embodiments, if an NMC determines an external network address that is exchanging encrypted or opaque network traffic with an external client, the NMC may be configured to consider that external network address as a candidate external VPN network address subject to further investigation.

At block 1706, in one or more of the various embodiments, the NMCs may be arranged to provide address profiles that may be associated with the one or more internal VPN network addresses and the one or more external network addresses. Accordingly, in some embodiments, NMCs may collect metrics associated with network traffic sent or received from the determined internal VPN network addresses or the determined external network addresses. In some embodiments, NMCs may be arranged to determine some or all of the metrics or fields to include address profiles based on rules, or the like, provided via configuration information.

At block 1708, in one or more of the various embodiments, correlation engines may be arranged to determine one or more correlation models to employ for correlating the one or more external network addresses with the one or more internal VPN network addresses. As described above, correlation models may be comprised of data structures, rules, instructions, or the like, that enable correlation models to provide correlation scores, confidence scores, or the like, that may be included in correlation profiles that may be associated with external and internal network addresses.

In one or more of the various embodiments, one or more correlation models may have restrictions based on input requirements, network configuration, traffic characteristics, or the like. Further, in one or more of the various embodiments, some correlation models may be arranged for correlating specific types of flows. For example, in some embodiments, some correlation models may be arranged for correlating transaction based network traffic rather than streaming network traffic, or the like.

Accordingly, in one or more of the various embodiments, correlation engines may be arranged to determine the relevant or qualified correlation models based on one or more of the characteristics of the network traffic associated with the determined network addresses, characteristics of the models, or the like. In some embodiments, correlation engines may be arranged to employ rules provided via configuration information for determine which correlation models to employ.

At block 1710, in one or more of the various embodiments, the correlation engines may be arranged to generate one or more correlation profiles based on the one or more correlation models or the one or more address profiles. In one or more of the various embodiments, correlation engines may be arranged to employ the one or more determined correlation models to produce correlation profiles for the internal/external network address associations under consideration. As described above, correlation profiles may be comprised of one or more sub-parts that may be evaluated to contribute to a total correlation score. In some embodiments, correlation engines may be arranged to represent scores as discrete values or probability distributions.

Also, in one or more of the various embodiments, two or more correlation models may be employed to provide the correlation profiles. In some embodiments, each correlation model may contribute one or more values or parts to correlation profiles. In some embodiments, correlation engines may be arranged to weight the contribution of different correlation models based on various factors, including user feedback, training feedback, rules provided via configuration information, or the like.

At decision block 1712, in one or more of the various embodiments, if correlated external network addresses and internal VPN network addresses may be discovered, control may flow to block 1714; otherwise, control may loop back block 1706. In one or more of the various embodiments, rules provided via configuration information may be employed to determine if a given correlation score should be considered relevant. In some embodiments, some of the scores included in a correlation profile may be discarded. For example, a correlation engine may be arranged to discard a highest score and a lower score to reduce outlier results skewing the overall correlation score.

At block 1714, in one or more of the various embodiments, the NMCs may be arranged to generate report information that may be associated with the correlation results. In some embodiments, NMCs may be arranged to generate report information that may include logs, notifications, or the like, that indicate if external network addresses may be correlated with internal VPN network addresses. In some embodiments, the particular type of report information as well as its format or destination may be determined using configuration information. For example, in some embodiments, configuration information may include a list of templates for providing log records associated with VPN gateway network address correlation.

Next, in one or more of the various embodiments, control may be returned to a calling process.

Figure 18:
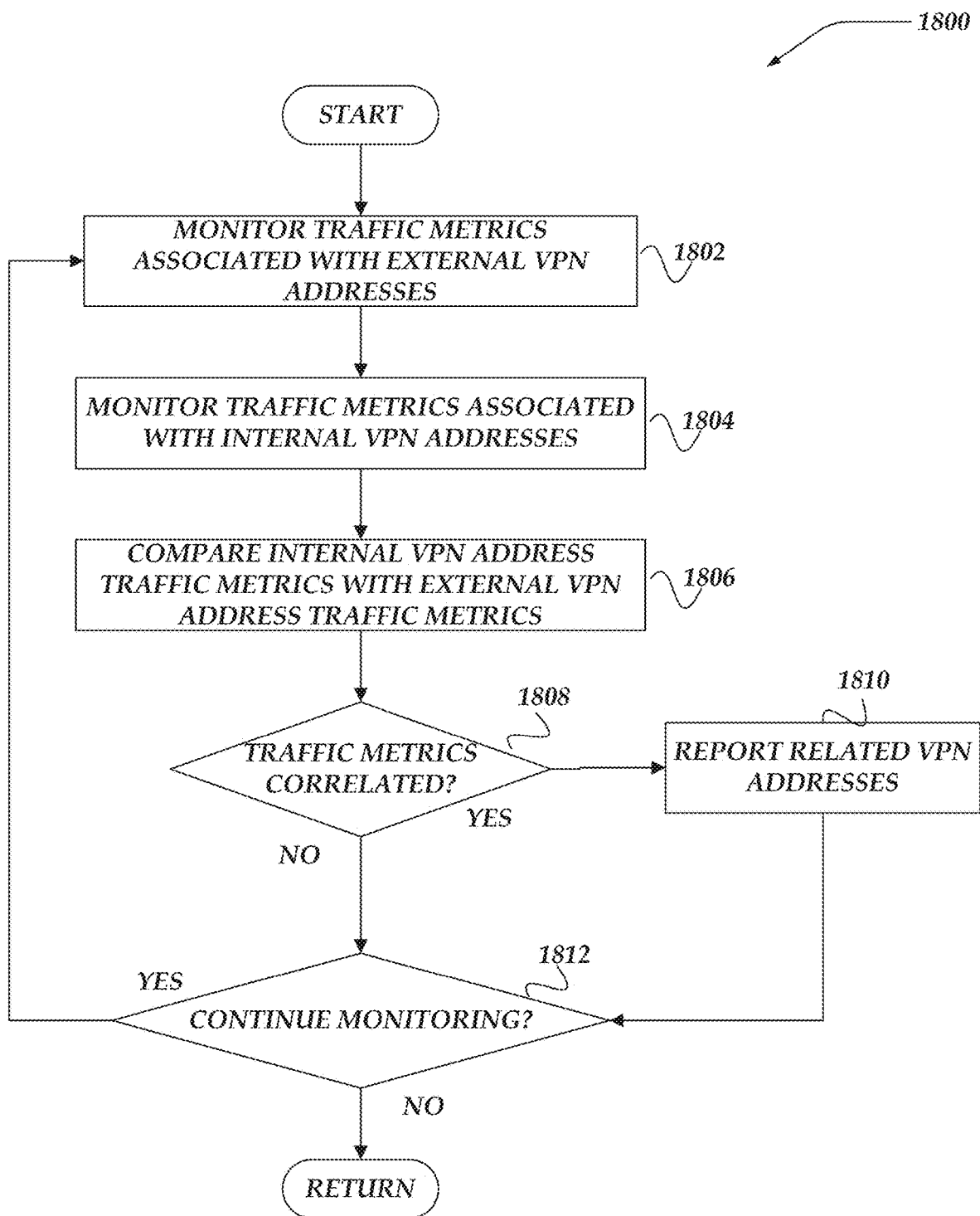
FIG. 18 illustrates a flowchart of a process for correlating network addresses associated VPN gateways in accordance with one or more of the various embodiments.

FIG. 18 illustrates a flowchart of process 1800 for correlating network addresses associated VPN gateways in accordance with one or more of the various embodiments. After a start block, at block 1802, in one or more of the various embodiments, NMCs may be arranged to monitor one or more traffic metrics associated with one or more external VPN network addresses. In some embodiments, as described above, NMCs may be arranged to generate one or more address profiles for various monitored network addresses. In some embodiments, traffic metrics may include the amount of network traffic sent or received from a monitored network address. In some embodiments, NMCs may be arranged to collect metrics over defined time intervals. For example, in some embodiments, a NMC may be configured to measure send/receive traffic for external VPN network addresses over 30 seconds. Thus, in some embodiments, NMCs may collect send/receive metrics bucketed into 30 second intervals. Also, for example, in some embodiments, NMCs may be arranged to similarly generate metrics based on running averages over a time period, or the like. Further, in some embodiments, NMCs may be arranged to monitor the timing or rate of "turns" of traffic going through external VPN network addresses. In some embodiments, a NMC may determine the occurrence of a turn if the direction or shape of network traffic reverses. For example, in some embodiments, if an external client sends request traffic to an external VPN network address and then shortly the external client is sent a large response originating from the external VPN network address, the NMC may register that a turn has occurred. Accordingly, in some embodiments, NMCs may be arranged to collect turn direction or turn history for one or more external VPN network addresses and include such metrics in the respective address profiles.

Note, in some embodiments, the particular metrics collected for each external VPN network addresses may vary depending on the correlation models that may be employed. Accordingly, in some embodiments, NMCs may be arranged to employ configuration information to determine the particular metrics to collect or record in address profiles.

At block 1804, in one or more of the various embodiments, NMCs may be arranged to monitor traffic metrics associated with one or more internal VPN network addresses. As described above NMCs may determine one or more internal VPN network addresses that may be associated with one or more VPN gateways. In one or more of the various embodiments, NMCs may be arranged to collect metrics for internal VPN network addresses that may be similar to as described for external VPN network addresses. Also, in some embodiments, as described above, NMCs may be arranged to generate address profiles for the one or more internal VPN network addresses.

However, in some embodiments, in some cases, NMCs may be configured to collect additional metrics for traffic associated with internal VPN network addresses because some or all of the protocol/payload information of the associated traffic may be observable if the internal network traffic is unsecured or otherwise made inspectable. For example, in some embodiments, NMCs may be arranged to determine individual network flows, protocol information, service information, application information, user information, or the like, from internal VPN network address traffic. In contrast, in some embodiments, NMCs may be disabled from obtaining this type of additional information from traffic associated with one or more external VPN network addresses because of VPN encryption.

At block 1806, in one or more of the various embodiments, NMCs may be arranged to compare internal VPN network address traffic metrics with external VPN network address metrics. As described above, in some embodiments, NMCs may be arranged to employ correlation engines or correlation models to generate correlation profiles for external or internal VPN network addresses. For example, in some embodiments, NMCs may be arranged to compare metrics associated with each external VPN network address with metrics associated with each internal VPN network address. Note, the specific correlation evaluation or comparison may be determined based on the correlation model being employ. For example, in some embodiments, a correlation model may be configured to compare the send/receive metrics of external VPN network addresses with internal VPN network address to determine if they may be similar. Also, for example, in some embodiments, a correlation model may be arranged to compare the timing of turns or turn metrics of external VPN network addresses with the timing of turns or turn metrics of internal VPN network addresses.

At decision block 1808, in one or more of the various embodiments, if traffic metrics associated with external VPN network addresses and internal VPN network address may be determined to be correlated, control may flow block 1810; otherwise, control may flow to decision block 1812. As described above, NMCs may be arranged to employ correlation models that include conditions, criteria, or the like, for determining if address profiles associated with external VPN network address or internal VPN network addresses may be considered correlated.

At block 1810, in one or more of the various embodiments, NMCs may be arranged to generate reporting information or notification information associated with the correlated external VPN network addresses and internal VPN network addresses.

At decision block 1812, in one or more of the various embodiments, if monitoring may continue, control may loop back to block 1802; otherwise, control may be returned to a calling process. In some embodiments, NMCs may be configured to continuously monitor network traffic associated with VPN gateways. Also, in some embodiments, NMCs may be configured to suspend or modify monitoring activity depending on various criteria that may be provided via configuration information to account for local requirements or local circumstances.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic using one or more network monitoring computers, comprising:

monitoring two or more network segments that are coupled by a traffic transformation device (TFD);

determining one or more external network addresses and one or more internal network addresses based on encrypted network traffic exchanged between one or more external endpoints and the TFD and internal network traffic exchanged between one or more internal endpoints and the TFD, wherein the internal network traffic is non-encrypted;

determining one or more metrics associated with the one or more external network addresses and one or more other metrics associated with the one or more internal network addresses based on the encrypted network traffic exchanged between one or more external endpoints and the TFD and the non-encrypted internal network traffic exchanged between one or more internal endpoints and the TFD;

providing one or more correlation scores for the one or more external network addresses and the one or more internal network addresses based on one or more of a correlation model, the one or more metrics, or the one or more other metrics; and in response to a correlation score associated with an external network address and an internal network address exceeding a threshold value, performing further actions, including:

associating the external network address and the internal network address with each other based on the correlation score; and providing a report that includes information about an association of the external network address with the internal network address.

2. The method of claim 1, further comprising:

determining a first metric associated with each of the one or more external network addresses based on a first amount of the encrypted network traffic sent from each external network address;

determining a second metric associated with each of the one or more external network addresses based on a second amount of the encrypted network traffic received by each external network address;

determining a third metric associated with each of the one or more internal network addresses based on a third amount of the internal network traffic sent from each internal network address;

determining a fourth metric associated with each of the one or more internal network addresses based on a fourth amount of the internal network traffic received by each internal network address; and updating the one or more correlation scores based on one or more similarities between the two or more of the first metric, the second metric, the third metric, or the fourth metric over a time interval.

3. The method of claim 1, further comprising:

determining one or more turns occurring on the encrypted network traffic based on identifying a change of direction of the encrypted network traffic, wherein the change of direction is indicated by the one or more metrics;

determining one or more other turns occurring on the internal network traffic based on identifying a change of direction of the internal network traffic, wherein the change of direction is indicated by the one or more other metrics; and updating the one or more correlation scores for the one or more external network addresses and the one or more internal network addresses based on one or more similarities of the one or more turns and the one or more other turns.

4. The method of claim 1, further comprising:

determining one or more internal services that are associated with one or more portions of the internal network traffic associated with the internal network address based on the one or more characteristics of the internal network traffic associated with the internal network address;

associating the one or more internal services with the external network address; and including information about the one or more internal services in the report.

5. The method of claim 1, further comprises:

progressively updating information associated with one or more metrics associated with the one or more external network addresses based on monitoring the encrypted network traffic in the one or more network segments; and progressively updating other information associated with one or more other metrics associated with the one or more internal network addresses based on monitoring the internal network traffic in the one or more other network segments; and updating the correlation score based on the updated information and the updated other information.

6. The method of claim 1, wherein the traffic forwarding device is one or more of a virtual private network gateway or network traffic proxy.

7. A processor readable non-transitory storage media that includes instructions for monitoring network traffic using one or more network monitoring computers, wherein execution of the instructions by the one or more networking monitoring computers perform a method comprising:

monitoring two or more network segments that are coupled by a traffic forwarding device (TFD);

determining one or more external network addresses and one or more internal network addresses based on encrypted network traffic exchanged between one or more external endpoints and the TFD and internal network traffic exchanged between one or more internal endpoints and the TFD, wherein the internal network traffic is non-encrypted;

determining one or more metrics associated with the one or more external network addresses and one or more other metrics associated with the one or more internal network addresses based on the encrypted network traffic exchanged between one or more external endpoints and the TFD and the internal network traffic exchanged between one or more internal endpoints and the TFD;

providing one or more correlation scores for the one or more external network addresses and the one or more internal network addresses based on one or more of a correlation model, the one or more metrics, or the one or more other metrics; and in response to a correlation score associated with an external network address and an internal network address exceeding a threshold value, performing further actions, including:

associating the external network address and the internal network address with each other based on the correlation score; and providing a report that includes information about an association of the external network address with the internal network address.

8. The media of claim 7, further comprising:
determining a first metric associated with each of the one or more external network addresses based on a first amount of the encrypted network traffic sent from each external network address;
determining a second metric associated with each of the one or more external network addresses based on a second amount of the encrypted network traffic received by each external network address;
determining a third metric associated with each of the one or more internal network addresses based on a third amount of the internal network traffic sent from each internal network address;
determining a fourth metric associated with each of the one or more internal network addresses based on a fourth amount of the internal network traffic received by each internal network address; and
updating the one or more correlation scores based on one or more similarities between the two or more of the first metric, the second metric, the third metric, or the fourth metric over a time interval.

9. The media of claim 7, further comprising:
determining one or more turns occurring on the encrypted network traffic based on identifying a change of direction of the encrypted network traffic, wherein the change of direction is indicated by the one or more metrics;
determining one or more other turns occurring on the internal network traffic based on identifying a change of direction of the internal network traffic, wherein the change of direction is indicated by the one or more other metrics; and
updating the one or more correlation scores for the one or more external network addresses and the one or more internal network addresses based on one or more similarities of the one or more turns and the one or more other turns.

10. The media of claim 7, further comprising:
determining one or more internal services that are associated with one or more portions of the internal network traffic associated with the internal network address based on the one or more characteristics of the internal network traffic associated with the internal network address;
associating the one or more internal services with the external network address; and
including information about the one or more internal services in the report.

11. The media of claim 7, further comprises:
progressively updating information associated with one or more metrics associated with the one or more external network addresses based on monitoring the encrypted network traffic in the one or more network segments;
progressively updating other information associated with one or more other metrics associated with the one or more internal network addresses based on monitoring the internal network traffic in the one or more other network segments; and
updating the correlation score based on the updated information and the updated other information.

12. The media of claim 7, wherein the traffic forwarding device is one or more of a virtual private network gateway or network traffic proxy.

13. A system for monitoring network traffic in a network:
one or more network monitoring computers (NMCs), comprising:
a transceiver that communicates over the network;
a memory that stores at least instructions; and
one or more processors that execute instructions that perform actions, including:
monitoring two or more network segments that are coupled by a traffic forwarding device (TFD);
determining one or more external network addresses and one or more internal network addresses based on encrypted network traffic exchanged between one or more external endpoints and the TFD and internal network traffic exchanged between one or more internal endpoints and the TFD, wherein the internal network traffic is non-encrypted;
determining one or more metrics associated with the one or more external network addresses and one or more other metrics associated with the one or more internal network addresses based on the encrypted network traffic exchanged between one or more external endpoints and the TFD and the internal network traffic exchanged between one or more internal endpoints and the TFD;
providing one or more correlation scores for the one or more external network addresses and the one or more internal network addresses based on one or more of a correlation model, the one or more metrics, or the one or more other metrics; and
in response to a correlation score associated with an external network address and an internal network address exceeding a threshold value, performing further actions, including:
associating the external network address and the internal network address with each other based on the correlation score; and
providing a report that includes information about an association of the external network address with the internal network address; and
one or more client computers, comprising:
a transceiver that communicates over the network;
a memory that stores at least instructions; and
one or more processors that execute instructions that perform actions, including:
providing one or more portions of the encrypted network traffic.

14. The system of claim 13, wherein the one or more NMC processors execute instructions that perform actions, further comprising:
determining a first metric associated with each of the one or more external network addresses based on a first amount of the encrypted network traffic sent from each external network address;
determining a second metric associated with each of the one or more external network addresses based on a second amount of the encrypted network traffic received by each external network address;
determining a third metric associated with each of the one or more internal network addresses based on a third amount of the internal network traffic sent from each internal network address;
determining a fourth metric associated with each of the one or more internal network addresses based on a fourth amount of the internal network traffic received by each internal network address; and
updating the one or more correlation scores based on one or more similarities between the two or more of the first metric, the second metric, the third metric, or the fourth metric over a time interval.

15. The system of claim 13, wherein the one or more NMC processors execute instructions that perform actions, further comprising:
determining one or more turns occurring on the encrypted network traffic based on identifying a change of direction of the encrypted network traffic, wherein the change of direction is indicated by the one or more metrics;
determining one or more other turns occurring on the internal network traffic based on identifying a change of direction of the internal network traffic, wherein the change of direction is indicated by the one or more other metrics; and
updating the one or more correlation scores for the one or more external network addresses and the one or more internal network addresses based on one or more similarities of the one or more turns and the one or more other turns.

16. The system of claim 13, wherein the one or more NMC processors execute instructions that perform actions, further comprising:
determining one or more internal services that are associated with one or more portions of the internal network traffic associated with the internal network address based on the one or more characteristics of the internal network traffic associated with the internal network address;
associating the one or more internal services with the external network address; and
including information about the one or more internal services in the report.

17. The system of claim 13, wherein the one or more NMC processors execute instructions that perform actions, further comprising:
progressively updating information associated with one or more metrics associated with the one or more external network addresses based on monitoring the encrypted network traffic in the one or more network segments;
progressively updating other information associated with one or more other metrics associated with the one or more internal network addresses based on monitoring the internal network traffic in the one or more other network segments; and
updating the correlation score based on the updated information and the updated other information.

18. The system of claim 13, wherein the traffic forwarding device is one or more of a virtual private network gateway or network traffic proxy.

19. A network monitoring computer (NMC) for monitoring network traffic between one or more computers, comprising:
a transceiver that communicates over the network;
a memory that stores at least instructions; and
one or more processors that execute instructions that perform actions, including:
monitoring two or more network segments that are coupled by a traffic forwarding device (TFD);
determining one or more external network addresses and one or more internal network addresses based on encrypted network traffic exchanged between one or more external endpoints and the TFD and internal network traffic exchanged between one or more internal endpoints and the TFD, wherein the internal network traffic is non-encrypted;
determining one or more metrics associated with the one or more external network addresses and one or more other metrics associated with the one or more internal network addresses based on the encrypted network traffic exchanged between one or more external endpoints and the TFD and the internal network traffic exchanged between one or more internal endpoints and the TFD;
providing one or more correlation scores for the one or more external network addresses and the one or more internal network addresses based on one or more of a correlation model, the one or more metrics, or the one or more other metrics; and
in response to a correlation score associated with an external network address and an internal network address exceeding a threshold value, performing further actions, including:
associating the external network address and the internal network address with each other based on the correlation score; and
providing a report that includes information about an association of the external network address with the internal network address.

20. The NMC of claim 19, wherein the one or more processors execute instructions that perform actions, further comprising:
determining a first metric associated with each of the one or more external network addresses based on a first amount of the encrypted network traffic sent from each external network address;
determining a second metric associated with each of the one or more external network addresses based on a second amount of the encrypted network traffic received by each external network address;
determining a third metric associated with each of the one or more internal network addresses based on a third amount of the internal network traffic sent from each internal network address;
determining a fourth metric associated with each of the one or more internal network addresses based on a fourth amount of the internal network traffic received by each internal network address; and
updating the one or more correlation scores based on one or more similarities between the two or more of the first metric, the second metric, the third metric, or the fourth metric over a time interval.

21. The NMC of claim 19, wherein the one or more processors execute instructions that perform actions, further comprising:
determining one or more turns occurring on the encrypted network traffic based on identifying a change of direction of the encrypted network traffic, wherein the change of direction is indicated by the one or more metrics;
determining one or more other turns occurring on the internal network traffic based on identifying a change of direction of the internal network traffic, wherein the change of direction is indicated by the one or more other metrics; and
updating the one or more correlation scores for the one or more external network addresses and the one or more internal network addresses based on one or more similarities of the one or more turns and the one or more other turns.

22. The NMC of claim 19, wherein the one or more processors execute instructions that perform actions, further comprising:
determining one or more internal services that are associated with one or more portions of the internal network traffic associated with the internal network address based on the one or more characteristics of the internal network traffic associated with the internal network address;

associating the one or more internal services with the external network address; and including information about the one or more internal services in the report.

23. The NMC of claim 19, wherein the one or more processors execute instructions that perform actions, further comprising:

progressively updating information associated with one or more metrics associated with the one or more external network addresses based on monitoring the encrypted network traffic in the one or more network segments;

progressively updating other information associated with one or more other metrics associated with the one or more internal network addresses based on monitoring the internal network traffic in the one or more other network segments; and updating the correlation score based on the updated information and the updated other information.

24. The NMC of claim 19, wherein the traffic forwarding device is one or more of a virtual private network gateway or network traffic proxy.

* * * * *